(12) United States Patent
Kitai et al.

(10) Patent No.: US 12,732,690 B2
(45) Date of Patent: Sep. 8, 2026

(54) DISPLAY CONTROL DEVICE AND DISPLAY CONTROL METHOD

(71) Applicant: CANON KABUSHIKI KAISHA, Tokyo (JP)

(72) Inventors: Shimpei Kitai, Chiba (JP); Ken Yanagibashi, Kanagawa (JP); Noboru Omori, Kanagawa (JP); Toshimichi Ise, Kanagawa (JP); Yosaku Endo, Kanagawa (JP); Yuta Nakamura, Kanagawa (JP); Tatsuhide Matsuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 18/737,153

(22) Filed: Jun. 7, 2024

(65) Prior Publication Data

US 2024/0323515 A1 Sep. 26, 2024

Related U.S. Application Data

(63) Continuation of application No. PCT/JP2022/039776, filed on Oct. 25, 2022.

(30) Foreign Application Priority Data

Dec. 15, 2021 (JP) ................................ 2021-203417

(51) Int. Cl.
*H04N 23/63* (2023.01)
*G09G 3/3208* (2016.01)

(52) U.S. Cl.
CPC ......... *H04N 23/634* (2023.01); *G09G 3/3208* (2013.01); *G09G 2330/045* (2013.01)

(58) Field of Classification Search
CPC .......... H04N 23/634; H04N 5/77; H04N 5/91; H04N 23/40; H04N 23/63; G09G 3/3208; G09G 2330/045; G03B 17/18; G03B 17/55; G06F 3/04842; G06F 3/04847; Y02D 10/00
See application file for complete search history.

(56) References Cited

U.S. PATENT DOCUMENTS

2010/0023678 A1* 1/2010 Nakanishi ............ G11C 16/102 327/512

FOREIGN PATENT DOCUMENTS

| | | | |
|---|---|---|---|
| JP | 2007074095 A | * | 3/2007 |
| JP | 2015222879 A | | 12/2015 |
| JP | 2017184141 A | | 10/2017 |
| JP | 2021157561 A | | 10/2021 |
| JP | 2022169241 A | | 11/2022 |
| WO | 2017170563 A1 | | 10/2017 |

* cited by examiner

*Primary Examiner* — Yogesh K Aggarwal
(74) *Attorney, Agent, or Firm* — Cowan, Liebowitz & Latman, P.C.

(57) ABSTRACT

A display control device of the present invention acquires information on a medium temperature of a first recording medium mounted to an electronic device. The display control device performs control to display, on a display, an item and time-series change in the medium temperature, the item indicating a first temperature at which a specific operation of the electronic device is possibly restricted in a case where the medium temperature reaches the first temperature, or indicating a second temperature based on the first temperature and lower than the first temperature.

18 Claims, 21 Drawing Sheets

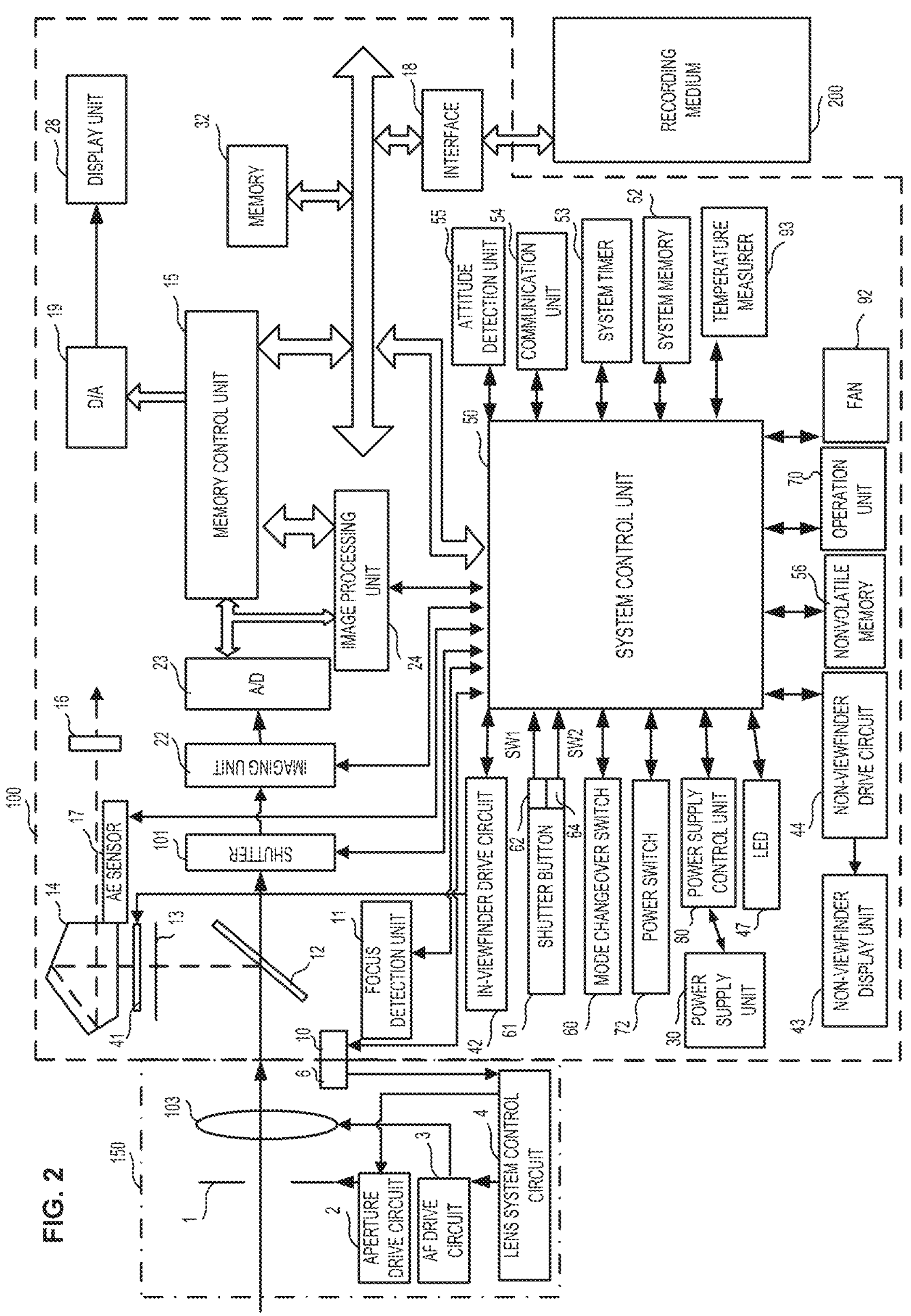
FIG. 2
DISPLAY UNIT
MEMORY
INTERFACE
RECORDING MEDIUM
D/A
MEMORY CONTROL UNIT
IMAGE PROCESSING UNIT
A/D
IMAGING UNIT
SHUTTER
AE SENSOR
FOCUS DETECTION UNIT
ATTITUDE DETECTION UNIT
COMMUNICATION UNIT
SYSTEM TIMER
SYSTEM MEMORY
TEMPERATURE MEASURER
FAN
SYSTEM CONTROL UNIT
OPERATION UNIT
NONVOLATILE MEMORY
NON-VIEWFINDER DRIVE CIRCUIT
NON-VIEWFINDER DISPLAY UNIT
IN-VIEWFINDER DRIVE CIRCUIT
SHUTTER BUTTON
SW1
SW2
MODE CHANGEOVER SWITCH
POWER SWITCH
POWER SUPPLY CONTROL UNIT
POWER SUPPLY UNIT
LED
APERTURE DRIVE CIRCUIT
AF DRIVE CIRCUIT
LENS SYSTEM CONTROL CIRCUIT

| MANUFACTURER NAME | MODEL NAME | WARNING TEMPERATURE OFFSET |
|---|---|---|
| COMPANY A | GOLD | - 1 ℃ |
| COMPANY A | SILVER | - 2 ℃ |
| COMPANY B | — | - 1 ℃ |
| COMPANY C | — | 0 ℃ |

| INDIVIDUAL IDENTIFICATION INFORMATION | RECORDING STOP TEMPERATURE |
|---|---|
| 111111 1111 | 60℃ |
| 222222 2222 | 65℃ |
| 333333 3333 | 50℃ |

| MANUFACTURER NAME | RECORDING STOP TEMPERATURE |
|---|---|
| MFR. A | 60℃ |
| MFR. B | 65℃ |
| MFR. C | 50℃ |

START
DISPLAY TEMPERATURE GRAPH
S1101
POSITION SELECTED?
S1102
NO
YES
DISPLAY SELECTION MESSAGE
S1103
YES BUTTON SELECTED?
S1104
NO
YES
DISPLAY DASHED LINE AT SELECTED POSITION
S1105
NO BUTTON SELECTED?
S1106
NO
YES
RECORD TEMPERATURE AT SELECTED POSITION AS NOTIFICATION TEMPERATURE
S1107
HIDE SELECTION MESSAGE
S1108

START
S1301
NOTIFICATION TEMPERATURE INFORMATION IS STORED?
NO
YES
ACQUIRE MEDIUM TEMPERATURE INFORMATION
S1302
S1303
MEDIUM TEMPERATURE ≤ NOTIFICATION TEMPERATURE?
NO
YES
S1304
DISPLAY UNIT HAS LIGHTED UP?
NO
YES
S1306
DISPLAY NOTIFICATION MESSAGE
S1305
LIGHT LED
S1307
OK BUTTON PRESSED?
NO
YES
S1308
HIDE NOTIFICATION MESSAGE
DELETE NOTIFICATION TEMPERATURE INFORMATION
S1309
END

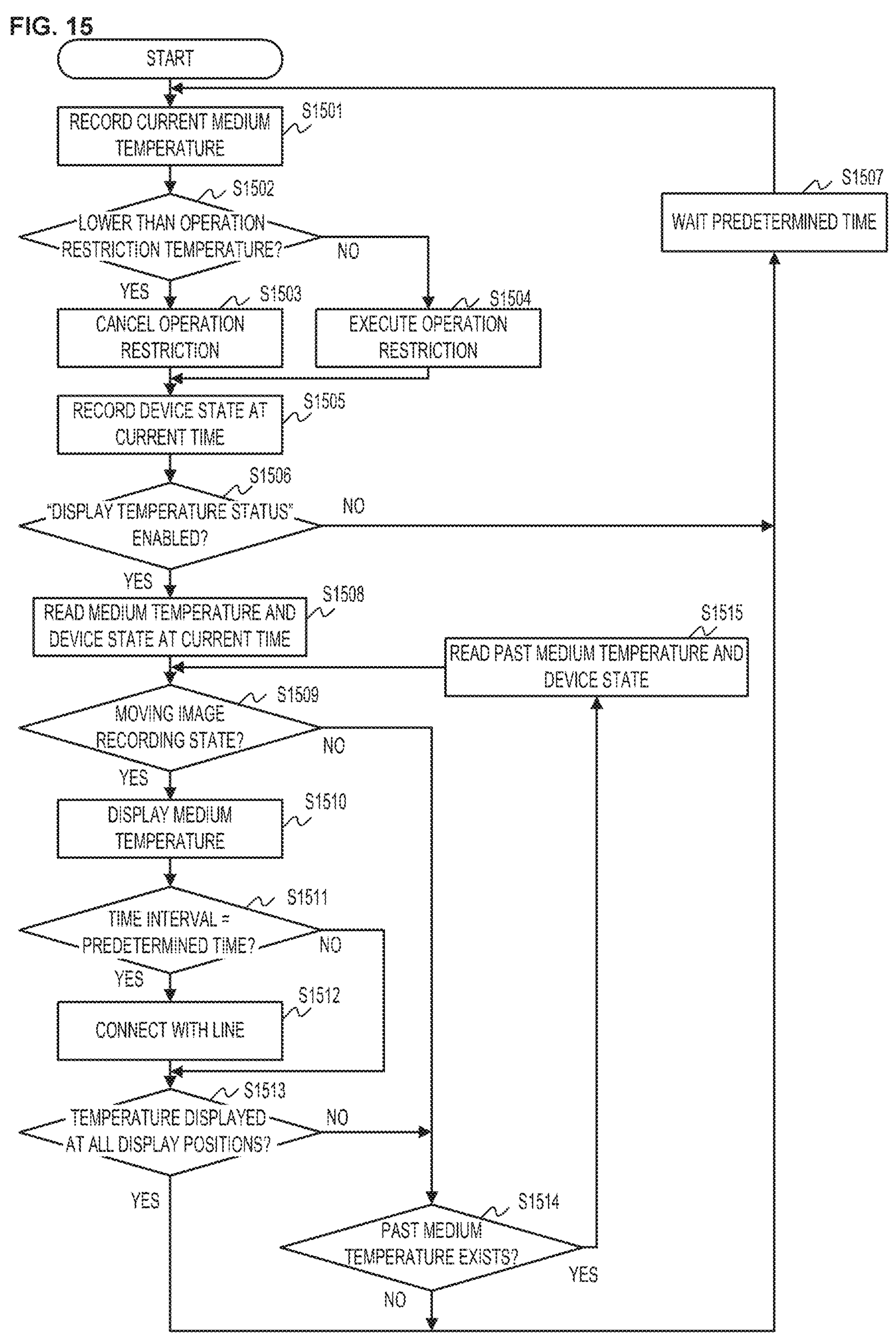
FIG. 15
START
RECORD CURRENT MEDIUM TEMPERATURE
S1501
S1502
LOWER THAN OPERATION RESTRICTION TEMPERATURE?
NO
YES
S1503
CANCEL OPERATION RESTRICTION
S1504
EXECUTE OPERATION RESTRICTION
RECORD DEVICE STATE AT CURRENT TIME
S1505
S1506
"DISPLAY TEMPERATURE STATUS" ENABLED?
NO
YES
READ MEDIUM TEMPERATURE AND DEVICE STATE AT CURRENT TIME
S1508
S1507
WAIT PREDETERMINED TIME
S1515
READ PAST MEDIUM TEMPERATURE AND DEVICE STATE
S1509
MOVING IMAGE RECORDING STATE?
NO
YES
DISPLAY MEDIUM TEMPERATURE
S1510
S1511
TIME INTERVAL = PREDETERMINED TIME?
NO
YES
S1512
CONNECT WITH LINE
S1513
TEMPERATURE DISPLAYED AT ALL DISPLAY POSITIONS?
NO
YES
S1514
PAST MEDIUM TEMPERATURE EXISTS?
YES
NO

FIG. 17

| MEDIUM TEMPERATURE | DEVICE STATE | TIME |
|---|---|---|
| 44 | MOVING IMAGE RECORDING | 11:00 |
| 43 | MOVING IMAGE RECORDING | 10:59 |
| 41 | MOVING IMAGE RECORDING | 10:58 |
| 41 | RECORDING STANDBY | 10:57 |
| ... | ... | ... |
| 49 | RECORDING STANDBY | 10:30 |
| 50 | MOVING IMAGE RECORDING | 10:29 |
| 43 | MOVING IMAGE RECORDING | 10:28 |
| 41 | MOVING IMAGE RECORDING | 10:27 |
| 38 | MOVING IMAGE RECORDING | 10:26 |
| 38 | RECORDING STANDBY | 10:25 |
| ... | ... | ... |
| 49 | RECORDING STANDBY | 8:41 |
| 50 | MOVING IMAGE RECORDING | 8:40 |
| 43 | MOVING IMAGE RECORDING | 8:39 |
| 42 | MOVING IMAGE RECORDING | 8:38 |
| 41 | MOVING IMAGE RECORDING | 8:37 |

1702
1703
1704
1705

START
READ TEMPERATURE RECORD INFORMATION
S1801
DISPLAY MULTIPLE TEMPERATURE GRAPHS
S1802
ACQUIRE INITIAL POSITION OF SELECTION FRAME
S1803
DISPLAY SELECTION FRAME
S1804
TEMPERATURE GRAPH SELECTED?
S1805
NO
YES
MOVE OPERATION?
S1806
NO
YES
DISPLAY SELECTED TEMPERATURE GRAPH
S1808
MOVE SELECTION FRAME
S1807
DISPLAY CURRENT CHANGE IN MEDIUM TEMPERATURE
S1809
END

SELECT TEMPERATURE GRAPHS TO BE COMPARED
1901
2021/10/19 8K MOVING IMAGE RECORDING
TIME[t]
1902
1905
2021/10/14 2K MOVING IMAGE RECORDING
TIME[t]
1903
2021/10/11 2K MOVING IMAGE RECORDING
TIME[t]
1904
2021/10/10 4K MOVING IMAGE RECORDING
TIME[t]

DISPLAY CONTROL DEVICE AND DISPLAY CONTROL METHOD

CROSS-REFERENCE TO RELATED APPLICATIONS

This application is a Continuation of International Patent Application No. PCT/JP 2022/039776, filed Oct. 25, 2022, which claims the benefit of Japanese Patent Application No. 2021-203417, filed Dec. 15, 2021, both of which are hereby incorporated by reference herein in their entirety.

BACKGROUND OF THE INVENTION

Field of the Invention

The present invention relates to a display control device and a display control method.

Background Art

Various recording media can be mounted to an electronic device such as a digital camera. The temperature of the recording medium may rise during image capturing. When the temperature of the recording medium becomes high, a recording element included in the recording medium may malfunction.

PTL 1 discloses technology in which a recording allowing bit rate is acquired based on recording medium identification information and temperature information acquired from a recording medium, and a warning indicating a rise in the temperature of the recording medium is issued in accordance with the recording allowing bit rate and the current set bit rate. According to this technology, a warning is issued if an electronic device is set to a bit rate at which the temperature of the recording medium can possibly become too high. The user can therefore ascertain the risk of a rise in temperature before moving-image recording or during moving-image recording.

However, in PTL 1, only an icon or a warning message is displayed, and therefore there has been a problem in that it is difficult for the user to determine the extent of a temperature-related risk in the electronic device at the current time (e.g., a length of time that image capturing can be allowed to continue from the current time, or an increase in temperature allowed to rise from the current time).

CITATION LIST

Patent Literature

PTL 1 Japanese Patent Application Publication No. 2017-184141

SUMMARY OF THE INVENTION

In view of this, an object of the present invention is to provide technology that enables a user to easily determine the extent of a temperature-related risk in an electronic device.

One aspect of the present invention relates to a display control device including: a processor; and a memory storing a program which, when executed by the processor, causes the display control device to perform a temperature acquiring process to acquire information on a medium temperature, the medium temperature being a temperature of a first recording medium mounted to an electronic device; and perform a control process to perform control to display, on a display, an item and time-series change in the medium temperature, the item indicating a first temperature at which a specific operation of the electronic device is possibly restricted in a case where the medium temperature reaches the first temperature, or indicating a second temperature based on the first temperature and lower than the first temperature.

Further features of the present invention will become apparent from the following description of exemplary embodiments with reference to the attached drawings.

BRIEF DESCRIPTION OF THE DRAWINGS

FIG. 2 is a configuration diagram of the digital camera according to the first embodiment.

FIG. 4 is a diagram illustrating support information according to the first embodiment.

FIGS. 9A and 9B are diagrams illustrating a table storing recording stop temperatures according to the third embodiment.

FIG. 15 is a flowchart showing processing of a digital camera according to a sixth embodiment.

FIG. 17 is a diagram illustrating temperature record information according to the sixth embodiment.

DESCRIPTION OF THE EMBODIMENTS

First Embodiment

Figure 1A:
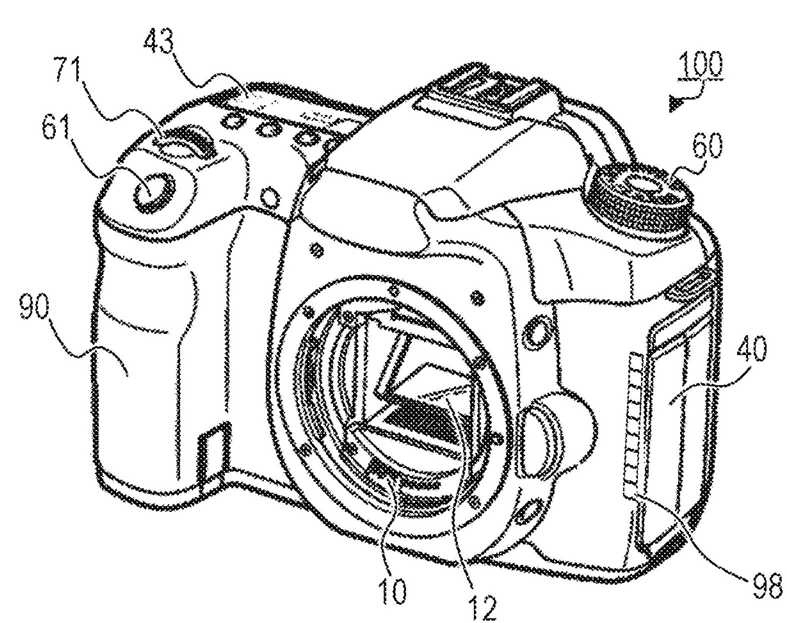
FIGS. 1A to 1C are diagrams illustrating a digital camera according to a first embodiment.
Figure 1B:
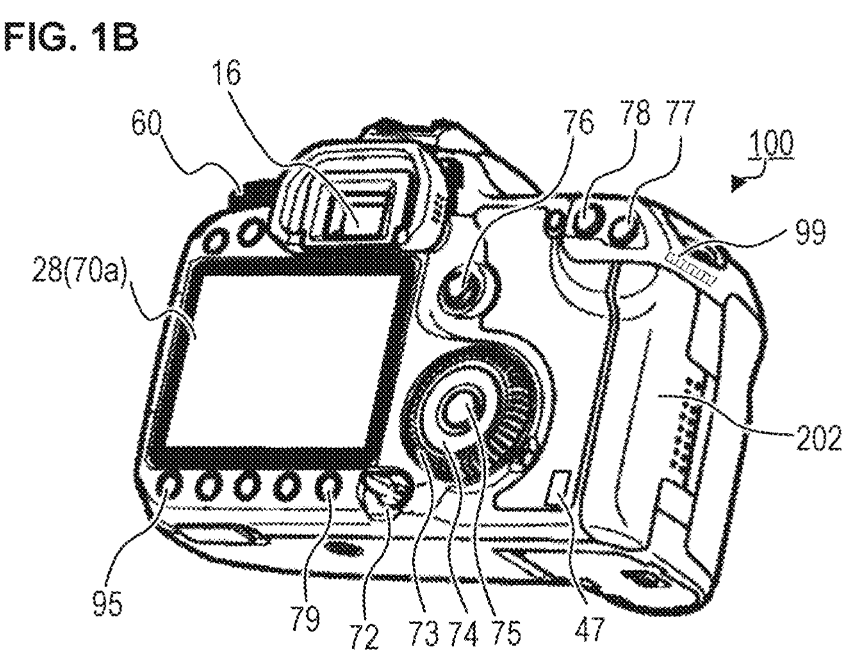

Hereinafter, preferred embodiments of the present invention will be described with reference to the drawings. FIGS. 1A and 1B show external views of a digital camera 100 as an example of a device to which the present invention is applicable. FIG. 1A is a front perspective view of the digital camera 100, and FIG. 1B is a rear perspective view of the digital camera 100. A display unit 28 is a display unit that is provided on the back of the camera and displays images and various types of information. A touch panel 70*a* is a touch-operable operation member, and can detect a touch operation performed on the display surface (operation surface) of the display unit 28. A non-viewfinder display unit 43 is a display unit that is provided on the top surface of the camera and displays various types of camera setting values such as the shutter speed and the aperture.

A shutter button 61 is an operation portion for giving an image capture instruction. In a still image capturing mode, the shutter button 61 is used to give an instruction to prepare for still image capture and to give an image capture instruction, and in a moving image capturing mode, the shutter button 61 is used to give instructions to start and stop moving image capturing (recording). A mode changeover switch 60 is an operation portion for switching between various modes. A terminal cover 40 is a cover that protects a connector (not shown) for connecting the digital camera 100 to a connection cable for connection with an external device. A main electronic dial 71 is a rotary operation member included in an operation unit 70. By turning the main electronic dial 71, the user can change setting values such as the shutter speed and the aperture. A power switch 72 is an operation member for turning the power of the digital camera 100 on and off. A sub electronic dial 73 is a rotary operation member included in the operation unit 70. By operating the sub electronic dial 73, the user can move a selection frame and move between images, for example. A cross key 74 is included in the operation unit 70 and is an operation member having a push button that can be pressed in four directions. The digital camera 100 can perform processing that corresponds to the direction in which the cross key 74 is pressed. A set button 75 is a push button included in operation unit 70. The set button 75 is mainly used for determining a selected item. A video button 77 is used to give instructions to start and stop moving image capturing (recording). By pressing an AE lock button 78 and then subsequently pressing the shutter button 61, the user can capture an image with a fixed AF position, or capture an image even in a situation where AF is not possible.

A playback button 79 is included in the operation unit 70 and is an operation button for switching between a capturing mode and a playback mode. When the playback button 79 is pressed during a capturing mode, the mode changes to the playback mode, and the latest image among the images recorded on the recording medium 200 can be displayed on the display unit 28. An assign button 95 is included in operation unit 70 and is a button to which another function can be assigned. In the initial state, the assign button 95 functions as a button for displaying a status screen. Examples of other functions that can be assigned to the assign button 95 include a function of changing setting content or the status of moving image capturing and playback, and a function of start moving image capturing (recording). Furthermore, the function of displaying the status screen can be assigned to an assign button other than the assign button 95.

The status screen is a screen that includes multiple pages and displays, for example, setting content and statuses regarding moving image capturing and playback, and the internal status of the digital camera.

A communication terminal 10 is a communication terminal for allowing the digital camera 100 to communicate with a lens unit 150 (removable), which will be described later. An eyepiece unit 16 is the eyepiece unit of an eyepiece finder (a peering type finder). An image displayed on an EVF (Electric View Finder) 29 of a viewfinder display unit can be viewed by the user through the eyepiece unit 16. A cover 202 is a cover for a slot in which the recording medium 200 and the battery are stored. A grip unit 90 is a holding unit shaped so as to be easily gripped by the user's right hand when holding the digital camera 100. The shutter button 61 and the main electronic dial 71 are arranged at positions where they can be operated with the index finger of the right hand while holding the digital camera by gripping the grip unit 90 with the little finger, ring finger, and middle finger of the right hand. The sub electronic dial 73 is also arranged at a position where it can be operated with the thumb of the right hand in the same state.

An air inlet 98 and an air outlet 99 are air passages for cooling the body of the digital camera 100, and when a fan 92 shown in FIG. 2 rotates, air flows from the air inlet 98 to the air outlet 99, thus making it possible to discharge heat from the body. Also, the body of the digital camera 100 includes a temperature measurer 93, and the temperature at a specific location in the body can be measured using the temperature measurer 93. The digital camera 100 stops the fan 92 or changes the rotation speed depending on the measured temperature. Note that a plurality of temperature measurers 93 and fans 92 may be provided in the digital camera 100.

An LED 47 is a light emitting unit that can indicate a state of the digital camera 100 by turning on, turning off, or blinking. Examples of statuses that can be indicated include whether the digital camera 100 is powered on or off, whether recording is being performed, whether a medium is being accessed, whether a system error has occurred, and whether or not the temperature of the digital camera 100 has reached a designated temperature.

FIG. 2 is a block diagram illustrating an example of the configuration of the digital camera 100 according to the present embodiment. The lens unit 150 is a lens unit to which a replaceable photographic lens is mounted. Although a lens 103 is usually constituted by a plurality of lenses, only one lens is shown here for simplicity. A communication terminal 6 is a communication terminal for allowing the lens unit 150 to communicate with the digital camera 100. The lens unit 150 communicates with a system control unit 50 via the communication terminal 6 and the communication terminal 10, and uses an internal lens system control circuit 4 to control an aperture 1 via an aperture drive circuit 2. The lens unit 150 then achieves focus by displacing the lens 103 via an AF drive circuit 3.

A shutter 101 is a focal plane shutter that can freely control the exposure time of an imaging unit 22 under control of the system control unit 50.

The imaging unit 22 is an imaging device constituted by a CCD, CMOS device, or the like, and converts an optical image into an electrical signal. An A/D converter 23 is used to convert an analog signal output from the imaging unit 22 into a digital signal.

An image processing unit 24 performs predetermined resizing processing (e.g., pixel interpolation or reduction) and color conversion processing on data from the A/D converter 23 and data from a memory control unit 15, which will be described later. The image processing unit 24 also performs predetermined calculation processing using captured image data. The system control unit 50 performs exposure control and distance measurement control based on calculation results obtained by the image processing unit 24. TTL (through-the-lens) AF (Automatic Focus) processing, AE (Automatic Exposure) processing, and EF (electronic flash pre-emission) processing are thus performed. The image processing unit 24 also performs predetermined calculation processing using captured image data, and performs TTL AWB (Auto White Balance) processing based on obtained calculation results.

The memory control unit 15 controls the transmission and reception of data between the A/D converter 23, the image processing unit 24, and a memory 32. Output data from the A/D converter 23 is written to the memory 32 via the image processing unit 24 and the memory control unit 15, or directly via the memory control unit 15. The memory 32 stores image data obtained by the imaging unit 22 and converted into digital data by the A/D converter 23, and image data for display on the display unit 28 or the EVF 29. The memory 32 has a storage capacity sufficient to store a predetermined number of still images and a predetermined duration of moving images and audio.

The memory 32 also serves as an image display memory (video memory). Display image data written in the memory 32 is transmitted to the display unit 28 or the EVF 29 via the memory control unit 15. The display unit 28 and the EVF 29 perform display on a display such as an LCD or organic EL in accordance with a signal from the memory control unit 15. Data subjected to A/D conversion by the A/D converter 23 and stored in the memory 32 is sequentially transferred to the display unit 28 or the EVF 29, and the data is displayed on the display unit 28 or the EVF 29 to realize live view display (LV display). Hereinafter, an image displayed by live view will be referred to as a live view image (LV image).

A compression unit 26 compresses image data (temporally continuous image data) stored in the memory 32 in a format such as Mpeg to generate moving image data. The generated moving image data is stored in the memory 32 via the memory control unit 15. The moving image data stored in the memory 32 is then multiplexed with audio likewise stored in the memory 32, and the multiplexed data is written to the recording medium 200 as a moving image file.

Various setting values of the camera such as the shutter speed and the aperture are displayed on the non-viewfinder display unit 43 via a non-viewfinder drive circuit 44.

A nonvolatile memory 56 is an electrically erasable/recordable memory (storage unit), and an EEPROM or the like is used. Constants, programs, and the like for the operation of the system control unit 50 are recorded in the nonvolatile memory 56. Here, "program" here refers to a program for executing various flowcharts described later in the present embodiment.

The system control unit 50 is a control unit constituted by at least one processor and/or at least one circuit, and performs overall control of the digital camera 100. The system control unit 50 realizes later-described processing of the present embodiment by executing programs recorded in the nonvolatile memory 56. For example, a RAM is used as a system memory 52. Constants and variables for the operation of the system control unit 50, programs read from the nonvolatile memory 56, and the like are loaded to the system memory 52. The system control unit 50 also performs display control by controlling the memory 32, the D/A converter 19, the display unit 28, and the like.

A system timer 53 is a timekeeping unit that measures the time used in various types of control and the time of a built-in clock.

The mode changeover switch 60, a first shutter switch 62, a second shutter switch 64, and the operation unit 70 are operation members (operation units) for inputting various types of operation instructions to the system control unit 50. The mode changeover switch 60 switches the operation mode of the system control unit 50 to the still image recording mode, the moving image capturing mode, the playback mode, or the like. Examples of still image recording modes include auto capturing mode, auto scene determination mode, manual mode, aperture priority mode (Av mode), shutter speed priority mode (Tv mode), and program AE mode. Examples of still image recording modes include various types of scene modes, which include capturing setting values for corresponding capturing scenes, and a custom mode. The mode changeover switch 60 allows the user to directly switch to any of these modes. Alternatively, the user may switch to a capturing mode list screen using the mode changeover switch 60, select one of the displayed modes, and then use another operation member to perform the switch. Similarly, the moving image capturing mode may include various modes.

The first shutter switch 62 turns on when the shutter button 61 of the digital camera 100 is operated partway, that is to say pressed half-way (instruction to prepare for photographing), and generates a first shutter switch signal SW1. In accordance with the generation of the first shutter switch signal SW1, the system control unit 50 starts to perform AF (Automatic Focus) processing, AE (Automatic Exposure) processing, AWB (Auto White Balance) processing, EF (electronic flash pre-emission) processing, or the like.

The second shutter switch 64 is turned on when the shutter button 61 is operated fully, that is to say press fully (image capture instruction), and generates a second shutter switch signal SW2. In accordance with the generation of the second shutter switch signal SW2, the system control unit 50 starts to perform a series of image capture processing from reading out signals from the imaging unit 22 to writing image data to the recording medium 200.

By selecting and operating various function icons displayed on the display unit 28, operation members of the operation unit 70 can be assigned appropriate functions for corresponding scenes and operate as various function buttons. Examples of function buttons include an end button, a return button, a previous/next image button, a jump button, a filter button, and an attribute change button. For example, when a menu button is pressed, a menu screen that enables setting various settings is displayed on the display unit 28. The user can intuitively set various setting values using the menu screen displayed on the display unit 28, a four-way button (up, down, left, right), and a set button.

The operation unit 70 includes various operation members that serve as input units that accept operations from the user. The operation unit 70 includes push buttons, a rotary dial, a touch sensor, or the like, and includes at least the following operation units. It includes at least the shutter button 61, the main electronic dial 71, the power switch 72, the sub electronic dial 73, the cross key 74, the set button 75, the video button 77, the AE lock button 78, the playback button 79, and the assign button 95.

A power supply control unit 80 includes a battery detection circuit, a DC-DC converter, a switch circuit that switches the blocks to which power is supplied, and the like. The power supply control unit 80 detects whether or not a battery is mounted, the type of battery, and the remaining battery amount. The power supply control unit 80 controls the DC-DC converter based on the detection result and the instruction from the system control unit 50, and supplies the required voltage to units (including the recording medium 200) for the required time. A power supply unit 30 includes a primary battery (e.g., alkaline battery or lithium battery), a secondary battery (e.g., NiCd battery, NiMH battery, or Li battery), an AC adapter, or the like.

An interface 18 is an interface with the recording medium 200, which is a memory card, a hard disk, or the like. The interface 18 has a function of detecting mounting and removal of the recording medium 200. The interface 18 also has functions of executing a write command for writing to the recording medium 200 when recording a moving image, a still image, and other data, and a function of executing a read command for reading from the recording medium 200 when reading a moving image, a still image, and other data. In the present embodiment, the interface 18 has a function of acquiring current temperature information from the recording medium 200 using a S.M.A.R.T. (Self-Monitoring Analysis and Reporting Technology) command. Furthermore, the interface 18 has a function of acquiring recording medium information (e.g., manufacturer, model, model number, serial number, and thermal throttling operating temperature) from the recording medium 200.

The thermal throttling operating temperature (TT operating temperature) is the temperature of the recording medium 200 at which execution of a thermal throttling function starts. Specifically, when the temperature of the recording medium 200 reaches the thermal throttling operating temperature (changes to a temperature greater than or equal to the thermal throttling operating temperature), the recording medium 200 executes the thermal throttling function. The thermal throttling function is a function of lowering the access speed of access to the recording medium 200, or stopping access, such that the recording element does not fail due to a rise in the temperature of the recording medium 200. By controlling the interface 18, the system control unit 50 can acquire information from the recording medium 200 and record information on the recording medium 200.

The recording medium 200 is a recording medium such as a memory card for recording captured images and moving image data. The recording medium 200 is constituted by a semiconductor memory, a magnetic disk, or the like. In particular, in the present embodiment, the recording medium 200 is envisioned to be a memory card such as an SD card, a CFexpress card (CFexpress is a registered trademark), or a CFast card (CFast is a registered trademark), but it is also possible to use a recording medium such as an SSD or a hard disk.

A communication unit 54 is for connecting to an external device wirelessly or via a wired cable, and transmits and receives image signals and audio signals. The communication unit 54 can also be used for connecting to a wireless LAN (Local Area Network) and the Internet. The communication unit 54 can also communicate with an external device using Bluetooth (registered trademark) or Bluetooth Low Energy. The communication unit 54 can transmit images captured by the imaging unit 22 (including LV images) and images recorded on the recording medium 200, and can also receive images and various other types of information from an external device.

An attitude detection unit 55 detects the attitude of the digital camera 100 relative to the direction of gravity. Based on the attitude detected by the attitude detection unit 55, the system control unit 50 can determine whether an image captured by the imaging unit 22 is an image captured while the digital camera 100 was held horizontally, or whether the image was captured while the digital camera 100 was held vertically. The system control unit 50 can add orientation information corresponding to the attitude detected by the attitude detection unit 55 to the image file of the image captured by the imaging unit 22, or rotate the image in accordance with the detected orientation and record the rotated image. An acceleration sensor, a gyro sensor, or the like can be used as the attitude detection unit 55. The attitude detection unit 55 can also detect movement of the digital camera 100 (e.g., panning, tilting, lifting, and whether the camera is stationary) using an acceleration sensor or a gyro sensor.

Note that, as one of the operation units 70, the digital camera 100 includes a touch panel **70*a* that can detect a touch on the display unit 28. The touch panel 70*a* and the display unit 28 can be integrated as a single member. For example, the touch panel 70*a* is configured such that the light transmittance does not interfere with the display on the display unit 28, and is attached to the upper layer of the display surface of the display unit 28. Then, input coordinates on the touch panel 70*a* are associated with display coordinates on the display screen of the display unit 28. Thereby, it is possible to provide a GUI (Graphical User Interface) that makes it seem as though the user can directly operate the screen displayed on the display unit 28. The system control unit 50 can detect the following operations or states with respect to the touch panel 70*a***.

A finger or a pen not touching the touch panel **70*a* is touched against the touch panel 70*a***. In other words, a touch starts (hereinafter referred to as Touch-Down).

The touch panel **70*a*** is being touched with a finger or a pen (hereinafter referred to as Touch-On).

A finger or a pen is moved while touching the touch panel **70*a*** (hereinafter referred to as Touch-Move).

A finger or a pen touching the touch panel **70*a*** is moved away from the touch panel. In other words, a touch ends (hereinafter referred to as Touch-Up).

A state in which nothing is touching the touch panel **70*a*** (hereinafter referred to as Touch-Off).

When Touch-Down is detected, Touch-On is also detected at the same time. After Touch-Down, Touch-On typically continues to be detected as long as Touch-Up is not detected. If Touch-Move is being detected, it also means that Touch-On is being detected. On the other hand, even if Touch-On is detected, if the touch position does not move, Touch-Move is not detected. After it is detected that all fingers or a pen touching are no longer in contact (Touch-Up), the Touch-Off state is detected.

These operations and states, as well as the positional coordinates where the finger or the pen is touching the touch panel **70*a*, are notified to the system control unit 50 through an internal bus. The system control unit 50 determines what touch operation has been performed on the touch panel 70*a* based on the notified information. In the case of Touch-Move, the direction of movement of a finger or a pen on the touch panel 70*a* can also be determined for both a vertical component and a horizontal component on the touch panel 70*a* based on changes in positional coordinates. If it is detected that Touch-Move has been performed for a predetermined distance or more, it is determined that a slide operation has been performed. An operation in which a finger is quickly moved a certain distance while touching the touch panel and then moved out of contact it is called a flick. In other words, a flick is an operation in which a finger quickly traces a line on the touch panel 70*a*** as if flicking. If it is detected that Touch-Move was performed for a predetermined distance or more at a predetermined speed or higher, and then Touch-Up is immediately detected, it can be determined that a flick has been performed (it can be determined that a flick has occurred after a slide operation).

Also, a touch operation in which multiple points (e.g., two points) are touched at the same time and the touch positions are brought closer to each other is called Pinch-In, and a touch operation in which the touch positions are moved away from each other is called Pinch-Out. Pinch-In and Pinch-Out are collectively referred to as a pinch operation (or simply a pinch).

The touch panel 70*a* may be any of various types of touch panels, such as a resistive film type, a capacitive type, a surface acoustic wave type, an infrared type, an electromagnetic induction type, an image recognition type, or an optical sensor type. The touch panel 70*a* may be of the type where a touch is detected when contact is made with the touch panel, or the type where a touch is detected when a finger or a pen approaches the touch panel.

Figure 1C:
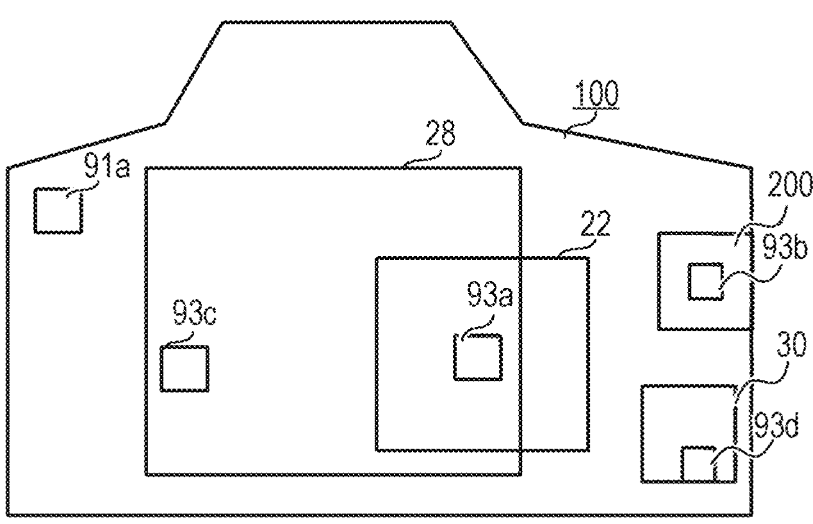

Temperature sensors 93*a* to 93*d* are temperature sensors that measure the temperature at the housing surface, inside, and around the digital camera 100. The temperature sensors 93*a* to 93*d* are temperature acquisition units included in the temperature measurer 93. FIG. 1C shows an example of locations of the temperature sensors.

FIG. 1C is a diagram showing the digital camera 100 from the display unit 28 side. The temperature sensor 93*a* is a temperature sensor arranged near the imaging unit 22, and measures the device proximity temperature of the imaging unit 22. The temperature sensor 93*b* is a temperature sensor arranged around the connector protected by the terminal cover 40, and measures a temperature for calculating the temperature at the housing surface of the digital camera 100. The temperature sensor 93*b* is used to prevent the user from suffering a low-temperature burn in the case where the surface of the housing reaches a certain high temperature (lower than the limit temperature for device protection, specifically around 46 degrees) and the user continues to operate the camera while holding the grip unit 90. The temperature sensor 93*c* is a temperature sensor arranged near the display unit 28, and measures the device proximity temperature of the display unit 28. The temperature sensor 93*d* is a temperature sensor arranged inside the cover 202, and measures the temperature of the recording medium 200 (the temperature near the recording medium 200). If any of these devices reach a high temperature (e.g., 80 degrees Celsius or higher), the device may not function properly, or the image quality may deteriorate. The temperature sensors 93*a* to 93*d* perform temperature measurement to prevent such problems. In the present embodiment, four temperature sensors are arranged near four devices, but the number and arrangement positions of the sensors are not limited to this.

In the first embodiment, a description will be given for operation of the digital camera 100 in the case where the recording medium 200 that executes (activates) a thermal throttling function when the temperature rises is mounted to the digital camera 100. Here, if the recording medium 200 activates the thermal throttling function while the digital camera 100 is recording a moving image on the recording medium 200, the moving image recording (capturing) is interrupted (stopped).

(Warning Temperature Determination Processing)

Figure 3B:
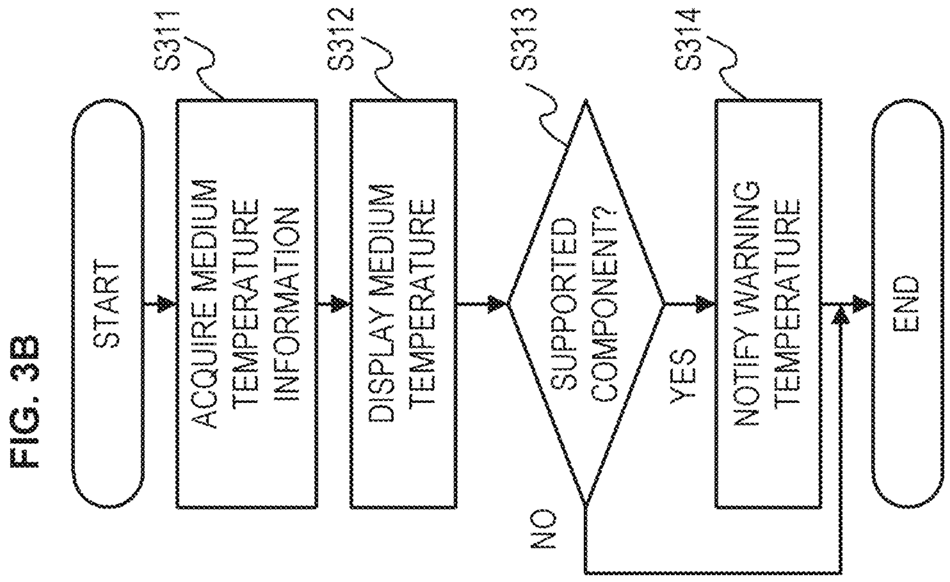
FIGS. 3A and 3B are flowcharts illustrating processing of the digital camera according to the first embodiment.
Figure 3A:
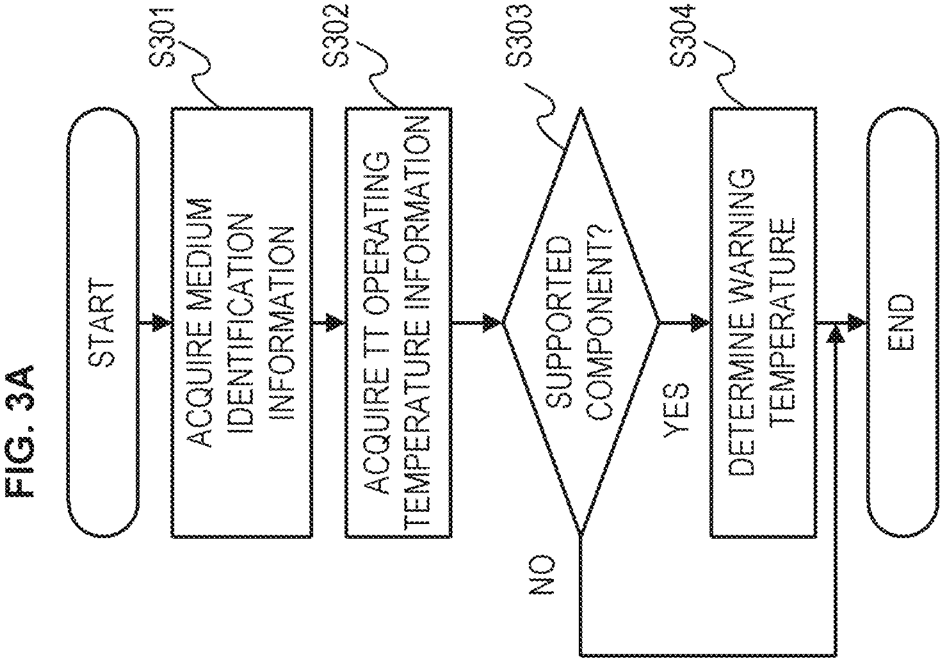

FIG. 3A is a flowchart showing processing for determining a warning temperature for warning that the temperature of the recording medium 200 is close to the temperature at which the operation of the digital camera 100 is restricted (i.e., a method for controlling the digital camera 100). The processing of the flowchart shown in FIG. 3A may be started at any timing as long as the recording medium 200 is mounted to the digital camera 100. Also, the processing of this flowchart is realized by the system control unit 50 loading a program from the nonvolatile memory 56 to the system memory 52 and executing the program.

In step S301, the system control unit 50 acquires medium identification information (information indicating the type of the recording medium 200) from the recording medium 200. The medium identification information is information such as the manufacturer and the model of the recording medium 200. In the following, the medium identification information is assumed to be a character string indicating a manufacturer name and a model name, but may also be abstracted information such as a manufacturer ID or a model ID.

In step S302, the system control unit 50 acquires information on the thermal throttling operating temperature (TT operating temperature) from the recording medium 200. The information on the thermal throttling operating temperature is the MXTMT (Maximum Thermal Management Temperature) in HCTM (Host Controlled Thermal Management) of the recording medium 200, for example. The thermal throttling operating temperature information may be information expressed in Celsius, Fahrenheit, or temperature range information.

In step S303, the system control unit 50 determines whether or not the recording medium 200 is a supported component (a recording medium supported by the digital camera 100). The system control unit 50 determines whether or not the recording medium 200 is a supported component by comparing support information 401 indicating medium identification information of supported components with the medium identification information acquired in step S301. In the case of determining that the recording medium 200 is a supported component, processing proceeds to S304, and otherwise, the processing of this flowchart ends.

FIG. 4 shows an example of the support information 401. The support information 401 is information recorded in the nonvolatile memory 56 in advance. The support information 401 may be recorded as fixed values in the nonvolatile memory 56 when the product is manufactured, and may be updated from initial values recorded in the nonvolatile memory 56 as the product (digital camera 100) is used. The support information 401 can also be updated using known deep learning technology, for example.

In the support information 401, a manufacturer name 402, a model name 403, and a warning temperature offset 404 are recorded in association with each other. The support information 401 indicates support for the models of recording media indicated by the model names 403 of the manufacturers indicated by the manufacturer names 402. The warning temperature offset 404 is information indicating an offset (difference) between the thermal throttling operating temperature and the warning temperature. The warning temperature offset 404 is determined in advance based on the results of studies on heat, noise, and the like conducted during the design and development of the digital camera 100.

In the example shown in FIG. 4, in the case where the manufacturer name 402 is “Company A” and the model name 403 is “GOLD”, the warning temperature offset 404 indicates −1 degree (° C.). In the case where the manufacturer name 402 is “Company A” and the model name 403 is “SILVER”, the warning temperature offset 404 indicates −2 degrees. In the case where the manufacturer name 402 is “Company B”, the warning temperature offset 404 indicates −1 degree for all model names. In the case where the manufacturer name 402 is “Company C”, the warning temperature offset 404 indicates 0 degrees for all model names.

Then, in step S303, the system control unit 50 determines that the recording medium 200 is a supported component if the manufacturer name and the model name indicated by the medium identification information acquired in step S301 match a manufacturer name 402 and a model name 403 in the support information 401. On the other hand, if a match is not found for the manufacturer name or the model name, the system control unit 50 determines that the recording medium 200 is not a supported component.

For example, the support information 401 indicates support for a recording medium with the manufacturer name 402 "Company B" and any name for the model name 403. Therefore, if the manufacturer name indicated by the media identification information is "Company B" and the model name is "BRONZE", it can be said that the manufacturer name and the model name match in the medium identification information and the support information 401.

In step S304, the system control unit 50 determines a warning temperature based on the thermal throttling operating temperature information acquired in step S302 and the warning temperature offset 404. Specifically, the system control unit 50 determines that the warning temperature is the sum of the thermal throttling operating temperature and the warning temperature offset 404. For example, if the thermal throttling operating temperature is 100 degrees and the warning temperature offset 404 is −1 degree, the warning temperature is 99 degrees.

(Graph Display Processing)

Next, processing for displaying a temperature graph indicating temperature status (graph display processing) will be described with reference to FIG. 3B.

Figure 5:
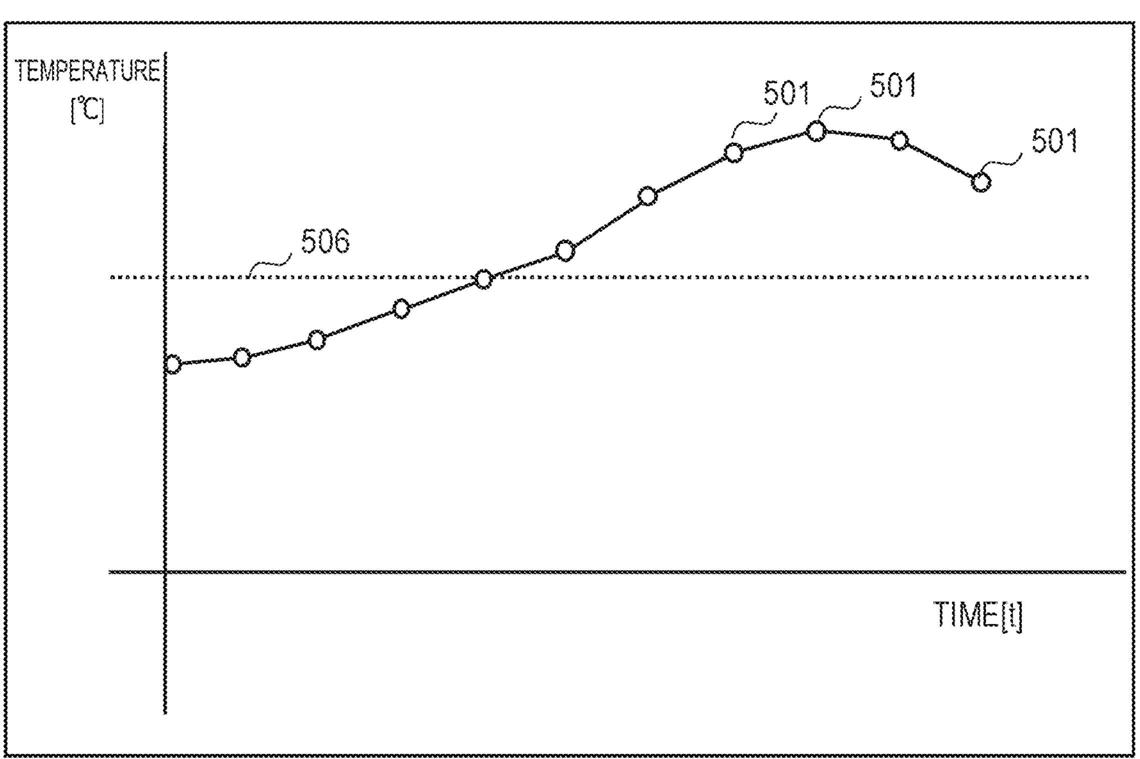
FIG. 5 is a diagram illustrating a temperature graph according to the first embodiment.

FIG. 5 shows a temperature graph displayed on the display unit 28 in the first embodiment. Points indicating the medium temperature at corresponding times are plotted in the temperature graph. Here, the medium temperature is the temperature of the recording medium 200. Specifically, the medium temperature is the temperature measured by the temperature sensor 93*d* or the temperature measured by the recording medium 200 (temperature measuring unit of the recording medium 200).

In the temperature graph, the horizontal axis indicates time and the vertical axis indicates temperature. The time at the origin of the graph is a past time that is a predetermined amount of time before the current time. A dotted line 506 is a scale line (item) indicating the warning temperature. The warning temperature does not need to be indicated by a line, and may instead be indicated by a colored band extending from the warning temperature to the thermal throttling operating temperature, for example.

Points 501 represent the medium temperature at corresponding times. When the points 501 are connected with line segments, the temperature graph shows change (time-series change) in the medium temperature from the past time to the current time. Note that information on the medium temperature is stored (recorded) in the memory 32 each time execution of the graph display processing shown in FIG. 3B is repeated at regular intervals. Each time the medium temperature information is acquired, the system control unit 50 adds a new point 501 to the temperature graph based on the medium temperature and the current time obtained from the system timer 53.

Note that in the present embodiment, it is assumed that the time interval for recording the medium temperature and the time interval for displaying the medium temperature are the same. However, these two time intervals may be set to different time intervals according to the driving frequency of the temperature measurer 93, the operating frequency of the system control unit 50, and the like.

The processing of the flowchart shown in FIG. 3B starts at regular intervals when "display temperature status", which is a setting for displaying a temperature graph, is enabled. It is assumed that at the start of the processing of this flowchart, a temperature graph indicating the medium temperature at a past time is displayed on the display unit 28. The processing in this flowchart is realized by the system control unit 50 loading a program from the nonvolatile memory 56 to the system memory 52 and executing the program.

In step S311, the system control unit 50 acquires information on the medium temperature at the current time. The system control unit 50 also obtains current time information from the system timer 53. The system control unit 50 stores the medium temperature information and the current time information in the memory 32 in association with each other.

In step S312, the system control unit 50 adds a point 501 indicating the medium temperature at the current time to the temperature graph based on the medium temperature information and the current time information acquired in step S311. In other words, the system control unit 50 adds (generates) the new point 501 in the temperature graph such that the value on the horizontal axis is the current time and the value on the vertical axis is the medium temperature. Furthermore, the system control unit 50 connects the newly added point 501 and the point 501 indicating the closest past time to the current time with a line in the temperature graph.

In step S313, the system control unit 50 determines whether or not the recording medium 200 is a supported component, similarly to step S303. In the case of determining that the recording medium 200 is a supported component, processing proceeds to step S314, and otherwise, the processing of this flowchart ends. According to step S313, if the recording medium 200 is not a supported component, the dotted line 506 indicating the warning temperature is not displayed.

In step S314, the system control unit 50 notifies (displays) the warning temperature. Specifically, the system control unit 50 generates, on the temperature graph, the dotted line 506 indicating the warning temperature calculated in step S304. At this time, the system control unit 50 adjusts the positions of the points 501 such that the position of the dotted line 506 indicating the warning temperature in the temperature graph (display unit 28) is a constant position regardless of the value of the warning temperature (whatever the value of the warning temperature is).

According to the present embodiment, the user can check how much difference there is between the current medium temperature and the warning temperature by looking at the temperature graph. Therefore, the user can easily select whether to start to execute moving image recording processing or suspend moving image recording processing (allow the digital camera 100 and the recording medium 200 to cool down). Also, since the warning temperature is displayed in accordance with the medium identification information of the recording medium 200, the user can accurately estimate the time until the risk of operational restriction of the digital camera 100 due to high temperature is eliminated.

Note that each time the system control unit 50 acquires the medium temperature information, the warning temperature may be compared with the current medium temperature, and in the case where the current medium temperature exceeds the warning temperature, the user may be notified (warned) of the fact that the temperature of the digital camera 100 is high. For example, this may be realized by displaying an icon (item) on the display unit 28 that notifies the user that the temperature is approaching the warning temperature (the difference between the thermal throttling operating temperature and the medium temperature is less than or equal to a predetermined temperature). Also, the system control unit 50 may display the thermal throttling operating temperature using a scale line instead of the warning temperature (or together with the warning temperature). Also, the warning temperature need only be based on the thermal throttling operating temperature, and may be less than the thermal throttling operating temperature (or the same temperature as the thermal throttling operating temperature). Therefore, the warning temperature may be a temperature that is a predetermined multiple (e.g., any multiple in the range of 0.8 times to 0.95 times) of the thermal throttling operating temperature.

Second Embodiment

In the second embodiment, instead of displaying the warning temperature, the digital camera 100 displays a scale line indicating the medium temperature (recording stop temperature) at which the digital camera 100 most recently stopped executing moving image recording due to a rise in the medium temperature, along with change (time-series change) in the medium temperature. The recording stop temperature is the medium temperature at which moving image recording actually stopped due to a rise in the medium temperature, and therefore can be said to be the temperature at which moving image recording may possibly stop if the medium temperature continues to rise.

Figure 6:
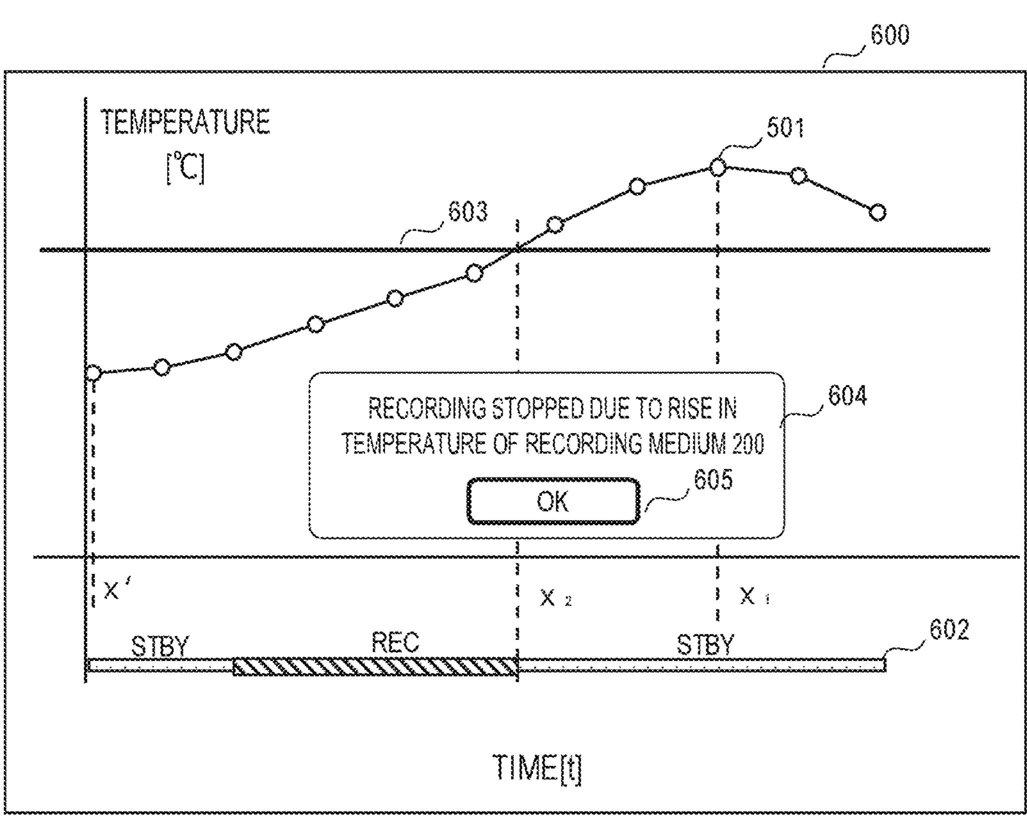
FIG. 6 is a diagram illustrating a temperature graph according to a second embodiment.

FIG. 6 shows a temperature graph 600 displayed on the display unit 28 in the second embodiment. The temperature graph 600 is a graph that displays change (time-series change) in the medium temperature and items indicating device states (an operating state bar 602, a warning message 604). In the temperature graph 600, the horizontal axis indicates time, and the vertical axis indicates temperature. The time at the origin of the graph is a past time x' that is a predetermined amount of time before the current time.

The operating state bar 602 shows change in the operating state (device state) of moving image recording of the digital camera 100. A solid line 603 indicates, as the recording stop temperature, the medium temperature at a time $x_2$ when moving image recording was stopped due to a rise in the temperature of the recording medium 200.

The system control unit 50 displays a warning message 604 together with the solid line 603 indicating the recording stop temperature at the time when the recording of the moving image was stopped due to a rise in the temperature of the recording medium 200. The system control unit 50 then continues to display the warning message 604 until a button 605 is pressed by the user.

According to the second embodiment, the solid line 603 indicating the recording stop temperature is displayed when moving image recording stopped due to a rise in the temperature of the recording medium 200, thus enabling the user to determine whether or not the medium temperature has fallen to a temperature at which moving image recording can be performed for a desired length of time. Furthermore, the user can determine how much the medium temperature can rise before the possibility of moving image recording stopping if moving image recording is performed again.

Third Embodiment

In a third embodiment, similarly to the second embodiment, the digital camera 100 displays a temperature graph showing the recording stop temperature and change (time-series change) in the medium temperature. In the third embodiment, unlike the second embodiment, a plurality of recording media 200 can be mounted to the digital camera 100, and temperature graph display processing performed by the digital camera 100 will be described.

The temperature graph display processing according to the third embodiment will be described below with reference to the flowchart shown in FIG. 7. The processing in this flowchart is realized by the system control unit 50 loading a program from the nonvolatile memory 56 to the system memory 52 and executing the program.

Figure 8:
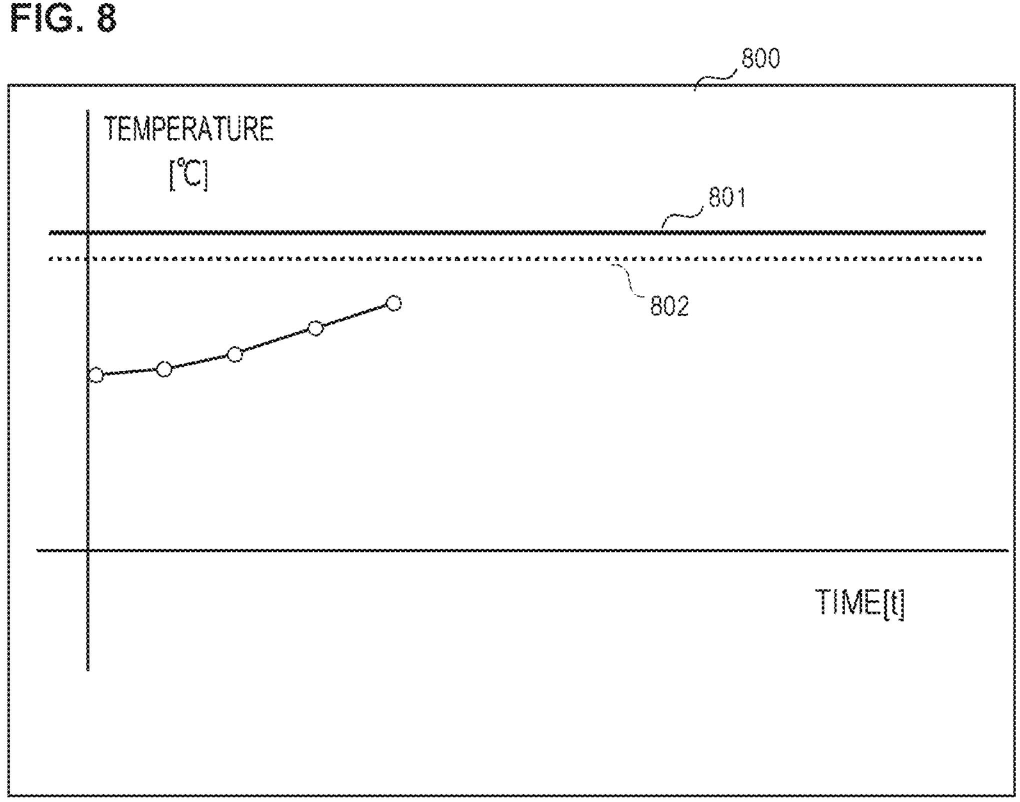
FIG. 8 is a diagram illustrating a temperature graph according to the third embodiment.

FIG. 8 is a diagram illustrating a temperature graph 800 according to the third embodiment. FIG. 8 is a diagram illustrating an example of displaying the recording stop temperature in the case where a plurality of recording media 200 (recording media 200A and 200B) are mounted to the digital camera 100. A solid line 801 (scale line) indicating the recording stop temperature is displayed at a position indicating the recording stop temperature of the recording medium 200A, which is the main recorded moving image storage destination (main recording medium; first type of recording medium). A dotted line 802 (scale line) indicating the recording stop temperature is displayed at a position indicating the recording stop temperature of the recording medium 200B, which is the sub recorded moving image storage destination (sub recording medium; second type of recording medium).

In this manner, the digital camera 100 uses a solid line and a dotted line to allow distinguishing between the recording stop temperature of the recording medium 200A, which is the main recording medium, and the recording stop temperature of the recording medium 200B, which is the sub recording medium. Here, the scale line indicating the recording stop temperature of the recording medium 200A and the scale line indicating the recording stop temperature of the recording medium 200B can be displayed in any desired display format (e.g., line color, line thickness, and use of multiple lines) in order to allowing distinguishing between them.

Figure 7:
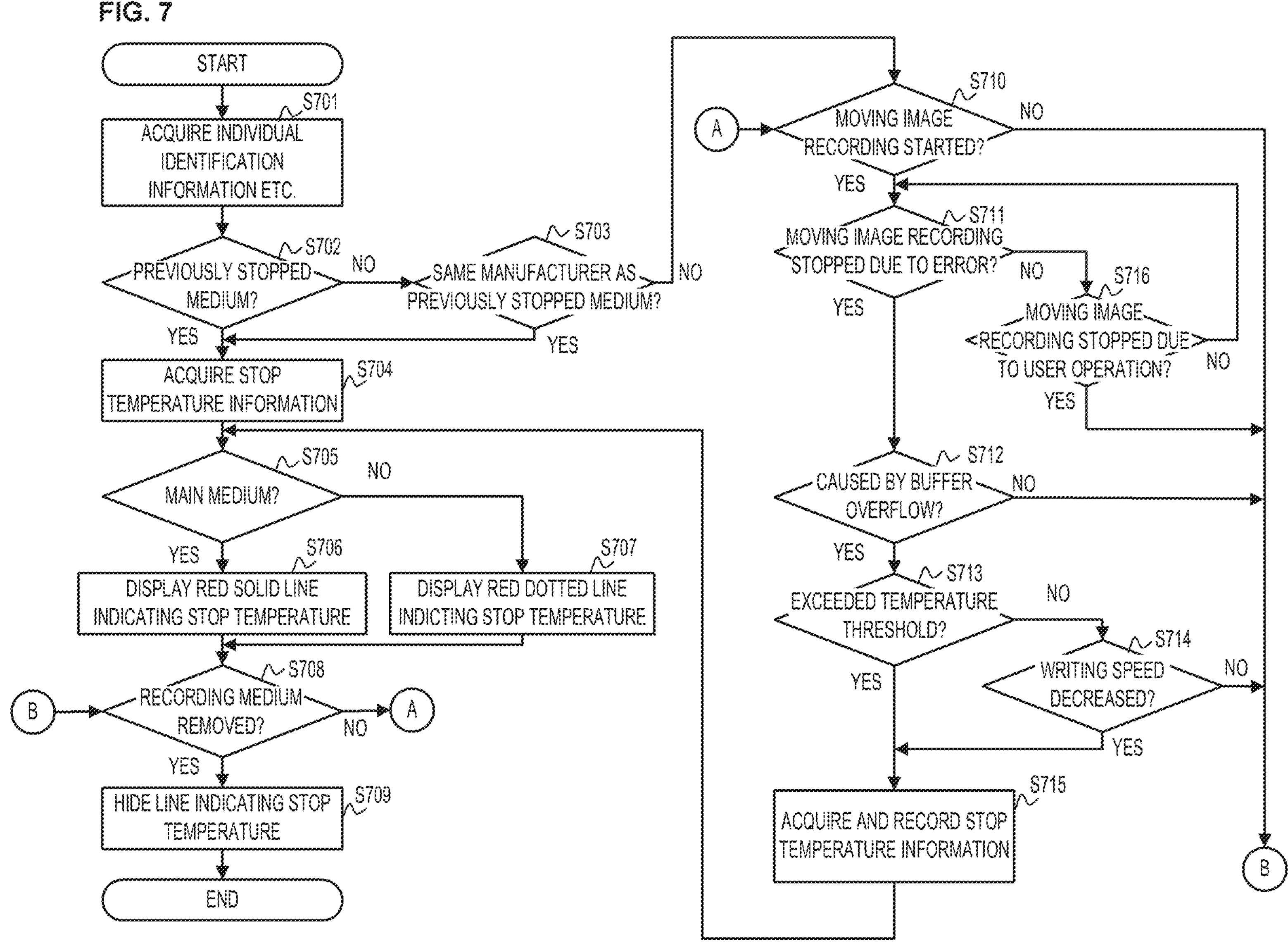
FIG. 7 is a flowchart showing processing of a digital camera according to a third

The flowchart shown in FIG. 7 is executed each time the system control unit 50 detects that a new recording medium 200 is mounted (attached) to the digital camera 100 while the "display temperature status" is enabled. In other words, in the case where a plurality of recording media 200 are mounted to the digital camera 100, the processing of the flowchart shown in FIG. 7 is executed for each of the recording media 200. The following describes the processing of this flowchart in the case where it is detected that a recording medium 200C has been mounted to the digital camera 100.

In step S701, the system control unit 50 acquires manufacturer information and individual identification information (a unique number for each recording medium) of the recording medium 200C from the recording medium 200C via the interface 18.

In step S702, the system control unit 50 determines whether or not the recording medium 200C is a previously stopped medium (a recording medium that was mounted to the digital camera 100 when moving image recording stopped in the past due to a rise in the temperature of the recording medium). Specifically, the system control unit 50 determines whether or not the individual identification information acquired in step S701 matches the individual identification information of a previously stopped medium. Note that the individual identification information of previously stopped media is held in the nonvolatile memory 56 in advance. In the case of determining that two pieces of individual identification information match, the processing proceeds to step S704, and otherwise, the processing proceeds to step S703.

For example, as shown in FIG. 9A, a table 901, which shows combinations of the individual identification information of a previously stopped medium and the recording stop temperature when moving image recording stopped in the previously stopped medium, is held in the nonvolatile memory 56. If the table 901 includes the same individual identification information as the individual identification information acquired in step S701, the system control unit 50 can determine that the individual identification information acquired in step S701 matches the individual identification information of a previously stopped medium.

In step S703, the system control unit 50 determines whether or not the manufacturer of the recording medium 200C is the same as the manufacturer of the previously stopped medium, which is different from the recording medium 200C. Specifically, the system control unit 50 determines whether or not the manufacturer name acquired in step S701 matches the manufacturer name of the previously stopped medium. Note that the manufacturer name of the previously stopped medium is held in the nonvolatile memory 56 in advance. In the case of determining that the two manufacturer names match, the processing proceeds to step S704, and otherwise, the processing proceeds to step S710.

For example, as shown in FIG. 9B, a table 902, which shows combinations of the manufacturer name of a previously stopped medium and the recording stop temperature at which moving image recording stopped in the previously stopped medium, is held in the nonvolatile memory 56. If the table 902 includes the same manufacturer name as the manufacturer name acquired in step S701, the system control unit 50 can determine that the manufacturer name acquired in step S701 matches the manufacturer name of the previously stopped medium.

Note that the data in the tables 901 and 902 is updated when moving image recording stops due to a rise in the temperature of the recording medium (S715). The data in the tables 901 and 902 continues to be held in nonvolatile memory 56 until a reset operation is performed to initialize various setting values of the digital camera 100.

In step S704, if the recording medium 200C is a previously stopped medium, the system control unit 50 acquires information on the recording stop temperature that corresponds to the individual identification information of the recording medium 200C from the table 901. Also, if the manufacturer of the recording medium 200C is the same as the manufacturer of the previously stopped medium, the system control unit 50 acquires information on the recording stop temperature that corresponds to the manufacturer name of the recording medium 200C from the table 902.

In step S705, the system control unit 50 determines whether or not the recording medium 200C is the main recording medium. In the case of determining that the recording medium 200C is the main recording medium, the processing proceeds to step S706, and otherwise (in the case of determining that the recording medium 200C is the sub-recording medium), the processing proceeds to step S707.

In step S706, the system control unit 50 displays a red solid line indicating the recording stop temperature acquired in step S704 or S715 on the temperature graph as a solid line indicating the recording stop temperature of the main recording medium.

In step S707, the system control unit 50 displays a red dotted line indicating the recording stop temperature acquired in step S704 or S715 on the temperature graph as a dotted line indicating the recording stop temperature of the sub recording medium.

In step S708, the system control unit 50 determines whether or not the recording medium 200C has been removed from the digital camera 100. In the case of determining that the recording medium 200C has been removed from the digital camera 100, the processing proceeds to step S709, and otherwise, the processing proceeds to step S710.

In step S709, the system control unit 50 hides the line indicating the recording stop temperature displayed on the temperature graph in step S706 or S707. If the removed recording medium 200C is the main recording medium, the system control unit 50 hides the solid line indicating the recording stop temperature of the main recording medium. If the removed recording medium 200C is the sub recording medium, the system control unit 50 hides the dotted line indicating the recording stop temperature of the sub recording medium.

In step S710, the system control unit 50 determines whether or not the digital camera 100 has started recording a moving image to the recording medium 200C (moving image recording). In the case of determining that moving image recording has started, the processing proceeds to step S711, and otherwise, the processing proceeds to step S708.

In step S711, the system control unit 50 determines whether moving image recording has stopped due to an error during moving image recording (not due to a user operation). In the case of determining that moving image recording has stopped due to an error during moving image recording, the processing proceeds to step S712, and otherwise, the processing proceeds to step S716.

In step S712, the system control unit 50 determines whether or not the error that occurred when moving image recording was stopped is an error related to a buffer overflow (an error caused by a buffer overflow). In the case of determining that the error is related to a buffer overflow, the processing proceeds to step S713, and otherwise, the processing proceeds to step S708.

In step S713, the system control unit 50 acquires information on the medium temperature of the recording medium 200C. The system control unit 50 then determines whether or not the medium temperature of the recording medium 200C exceeds a temperature threshold value corresponding to the manufacturer of the recording medium 200C (temperature threshold value set in advance for each manufacturer). In the case of determining that the medium temperature of the recording medium 200C exceeds the temperature threshold value, the processing proceeds to step S715, and otherwise (in the case of determining that the medium temperature of the recording medium 200C is less than or equal to the temperature threshold value), the processing proceeds to step S714.

In step S714, the system control unit 50 determines whether or not the writing speed of the recording medium 200C has decreased. If the writing speed of the recording medium 200C immediately before the stopping of moving image recording due to an error is slower than the writing speed of the recording medium 200C at the time when moving image recording was started in step S709, the system control unit 50 determines that the writing speed of the recording medium 200C has decreased. Note that during moving image recording, the system control unit 50 measures the writing speed while performing writing to the recording medium 200C. Information on the measured writing speed is stored in the system memory 52. In the case of determining that the writing speed of the recording medium 200C has decreased, the processing proceeds to step S715, and otherwise, the processing proceeds to step S708.

In step S715, the system control unit 50 acquires information on the medium temperature of the recording medium 200C at the time when the moving image recording stopped due to an error, as information on the recording stop temperature. The system control unit 50 then records the individual identification information of the recording medium 200C and the recording stop temperature information in association with each other in the table 901 shown in FIG. 9A. Also, the system control unit 50 records the manufacturer name of the recording medium 200C and the information on the recording stop temperature in association with each other in the table 902 shown in FIG. 9B.

Note that if the manufacturer name of the recording medium 200C already exists in the table 902, the system control unit 50 updates the information on the recording stop temperature information stored in association with that manufacturer name in the table 902 with the newly acquired information on the recording stop temperature. This similarly applies when the individual identification information of the recording medium 200C already exists in the table 901. In other words, the information in the tables 901 and 902 is updated every time moving image recording is stopped due to a rise in temperature, and thus the tables 901 and 902 can have the most recently acquired information on the recording stop temperature. For example, the information in the table 902 may be updated only in the case where the manufacturer name of the recording medium 200C already exists in the table 902 and furthermore the recording stop temperature associated with that manufacturer name in the table 902 is higher than the newly acquired recording stop temperature. This similarly applies to the table 901. According to this configuration, the information on the recording stop temperature held in the tables 901 and 902 can be information on the lowest medium temperature among the medium temperatures when moving image recording was stopped due to a temperature rise. Therefore, when a scale line indicating the recording stop temperature is displayed on the temperature graph, the user can know the lowest medium temperature at which moving image recording may be stopped due to a temperature rise. Also, as the recording stop temperatures stored for each manufacturer name (individual identification information) in the tables 901 and 902, the system control unit 50 may store an average value and a median value of medium temperatures when moving image recording was stopped due to a temperature rise in the past. According to this configuration, it is possible to suppress a large change in the recording stop temperature caused by variation in the medium temperature when moving image recording is stopped (when a specific operation is restricted).

Note that in step S712 to step S714, the system control unit 50 determines whether or not moving image recording has stopped due to a rise in the temperature of the recording medium 200C. Specifically, in the case where the error that occurred is an error caused by a buffer overflow and furthermore the medium temperature exceeds the temperature threshold value, the system control unit 50 determines that moving image recording stopped due to a rise in the temperature of the recording medium 200C. Also, in the case where the error that occurred is an error caused by a buffer overflow and furthermore the writing speed of the recording medium 200C has decreased, the system control unit 50 determines that moving image recording stopped due to a rise in the temperature of the recording medium 200C. Information on the recording stop temperature is acquired and recorded (updated) in step S715 only in the case where it was determined that moving image recording stopped due to a rise in the temperature of the recording medium 200C.

In step S716, the system control unit 50 determines whether or not moving image recording was stopped by a user operation (not due to an error). In the case of determining that moving image recording was stopped by a user operation, the processing proceeds to step S708, and otherwise, the processing proceeds to step S711.

According to the present embodiment, the medium temperature at the time when moving image recording most recently stopped due to a rise in the medium temperature is displayed, thus allowing the user to more accurately determine the medium temperature at which moving image recording may stop. Therefore, the user can more accurately estimate the timing at which moving image recording may stop due to a rise in the medium temperature.

Fourth Embodiment

In the description of a fourth embodiment, when the medium temperature has fallen below a temperature (notification temperature) set by the user, the digital camera 100 notifies the user that the medium temperature has fallen. According to the fourth embodiment, for example, in the case where the medium temperature has risen above the recording stop temperature and the user has stopped moving image recording in order to lower the temperature of the recording medium 200, the user can determine when the medium temperature has decreased at an appropriate timing. Therefore, the user then can immediately start performing moving image recording again.

(Notification Temperature Setting Processing)

Figure 10:
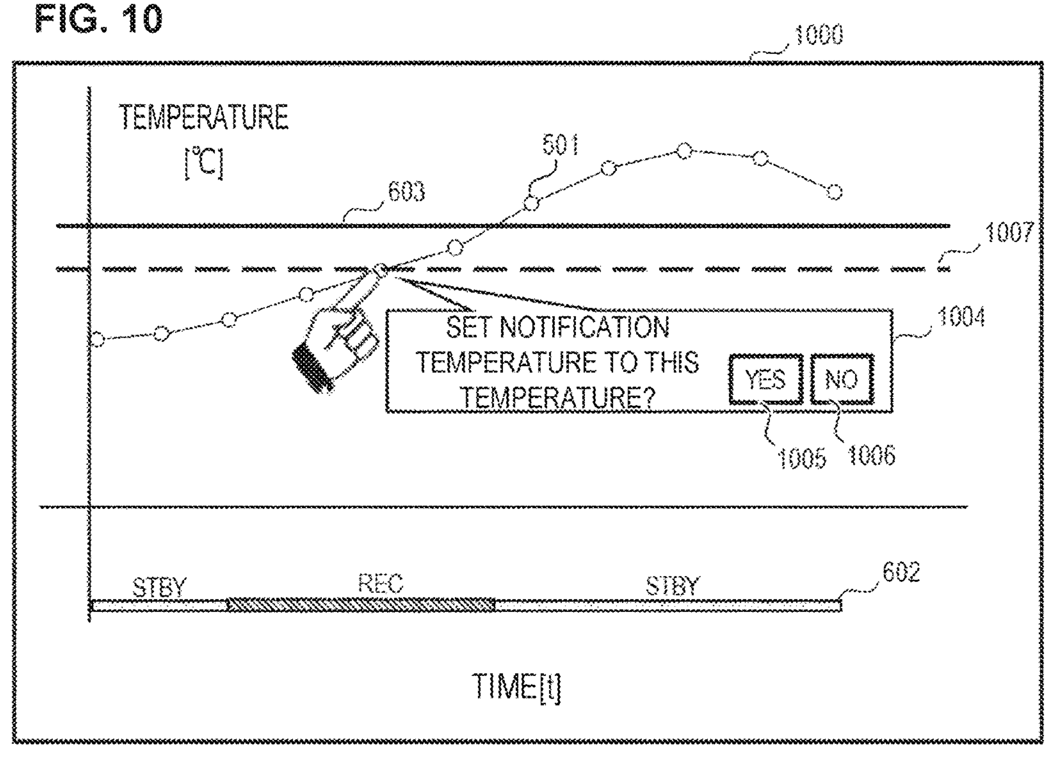
FIG. 10 is a diagram illustrating a temperature graph according to a fourth embodiment.

First, processing by which the digital camera 100 sets the notification temperature will be described. FIG. 10 shows a temperature graph 1000 that allows the user to set a notification temperature, along with the content of the temperature graph 600 shown in FIG. 6.

A selection message 1004 is displayed when a position in the temperature graph 1000 is selected (touched) by the user. The selection message 1004 is a message for allowing the user to select whether or not the temperature indicated by the selected position is to be set as the notification temperature. By selecting (touching) the YES button 1005 or the NO button 1006, the user can select whether or not the temperature indicated by the selected position is to be set as the notification temperature. A dashed line 1007 is a scale line indicating the notification temperature set by the user. The line indicating the notification temperature is not limited to a dashed line, and may be displayed in any display format (solid line, any color, any thickness, multiple lines).

Figure 11:
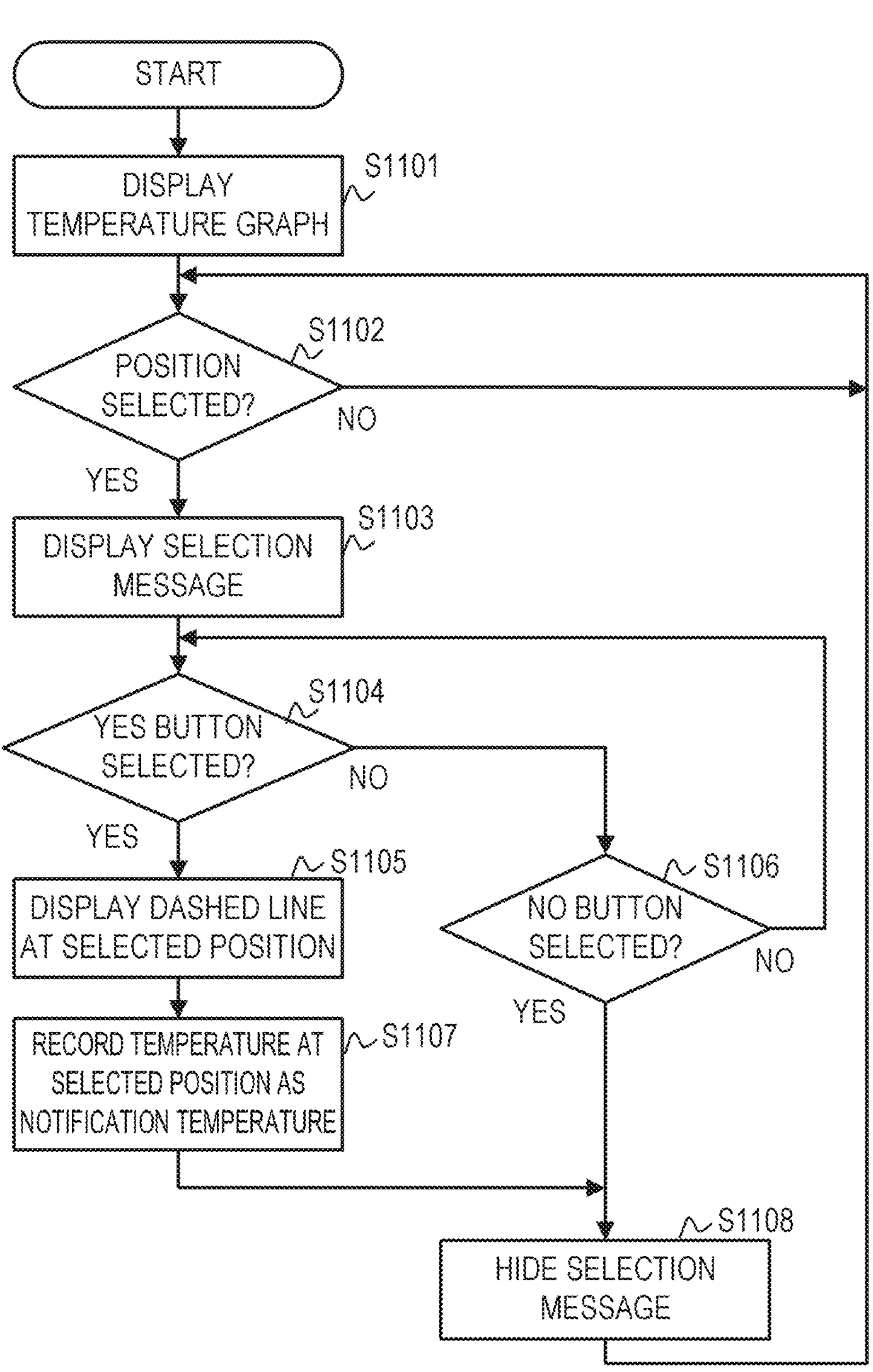
FIG. 11 is a flowchart showing notification temperature setting processing according to the fourth embodiment.

The processing of setting the notification temperature will be described below with reference the flowchart of FIG. 11. This flowchart starts when "display temperature status" is enabled. The processing in this flowchart is realized by the system control unit 50 loading a program from the nonvolatile memory 56 to the system memory 52 and executing the program.

In step S1101, the system control unit 50 displays the temperature graph 1000 without displaying the selection message 1004. For example, based on the processing of the flowcharts shown in FIGS. 3A and 3B, the system control unit 50 displays a scale line indicating the "recording stop temperature" instead of the "warning temperature", a polygonal line indicating change in the medium temperature, and the like on the display unit 28.

In step S1102, the system control unit 50 determines whether or not a user operation selecting a position on the temperature graph 1000 (e.g., a touch on the touch panel 70*a*) has been performed. In the case of determining that a user operation selecting a position has been performed, the processing proceeds to step S1103, and otherwise, the processing of step S1102 is repeated.

In step S1103, the system control unit 50 displays the selection message 1004 to indicate the position selected by the user operation.

In step S1104, the system control unit 50 determines whether or not a YES button 1005 has been selected (touched) by the user. In the case of determining that the YES button 1005 has been selected, the processing proceeds to step S1105, and otherwise, the processing proceeds to step S1106.

In step S1105, the system control unit 50 displays a scale line that is parallel to the horizontal axis and includes the position selected by the user operation. This scale line is the dashed line 1007 indicating the notification temperature.

In step S1106, the system control unit 50 determines whether or not a NO button 1006 has been selected (touched) by the user. In the case of determining that the NO button 1006 has been selected, the processing proceeds to step S1108, and otherwise, the processing proceeds to step S1104.

In step S1107, the system control unit 50 stores (records) temperature information corresponding to the position selected by the user operation in the system memory 52 as notification temperature information. In other words, the system control unit 50 acquires information on the notification temperature set by the user and stores the acquired information in the system memory 52. Note that if notification temperature information is already stored in the system memory 52, the stored notification temperature information is updated to information on the temperature that corresponds to the position selected by the user operation.

In step S1108, the system control unit 50 hides the selection message 1004.

(User Notification Processing)

Figure 12A:
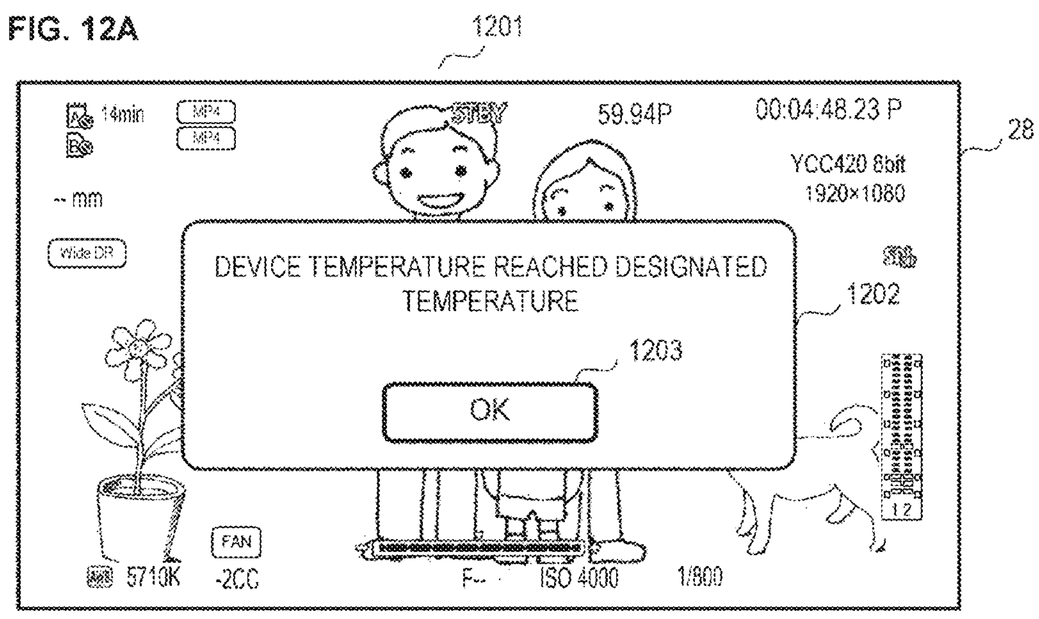
FIGS. 12A and 12B are diagrams illustrating a user notification according to the fourth embodiment.

The following describes processing for, when the medium temperature has changed to a temperature less than or equal to the notification temperature (when the medium temperature has reached the notification temperature), notifying that the medium temperature changed to a temperature less than or equal to the notification temperature. FIG. 12A is a diagram illustrating an example of using a notification message to notify the user when the medium temperature changes to a temperature less than or equal to the notification temperature. A screen 1201 is a screen displayed on display unit 28 during image capturing.

A notification message 1202 is a message that is displayed when the medium temperature changes to a temperature less than or equal to the notification temperature. The notification message 1202 continues to be displayed on the screen 1201 until an OK button 1203 is selected. In the example shown in FIG. 12A, the notification message 1202 shows the character string "Device temperature reached designated temperature".

Figure 12B:
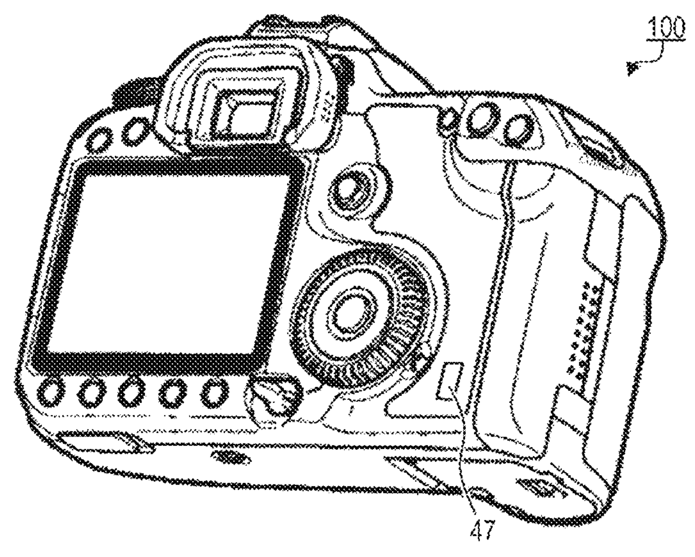

FIG. 12B is a diagram illustrating an example of not using the notification message 1202 to notify the user when the medium temperature changes to a temperature less than or equal to the notification temperature. If the display unit 28 cannot be used for some sort of reason (e.g., when the display unit 28 is off), the digital camera 100 can use an LED 47 to notify the user that the medium temperature has changed to a temperature less than or equal to the notification temperature. The LED 47 is lit or blinked, for example, to notify that the medium temperature has changed to a temperature less than or equal to the notification temperature by.

Figure 13:
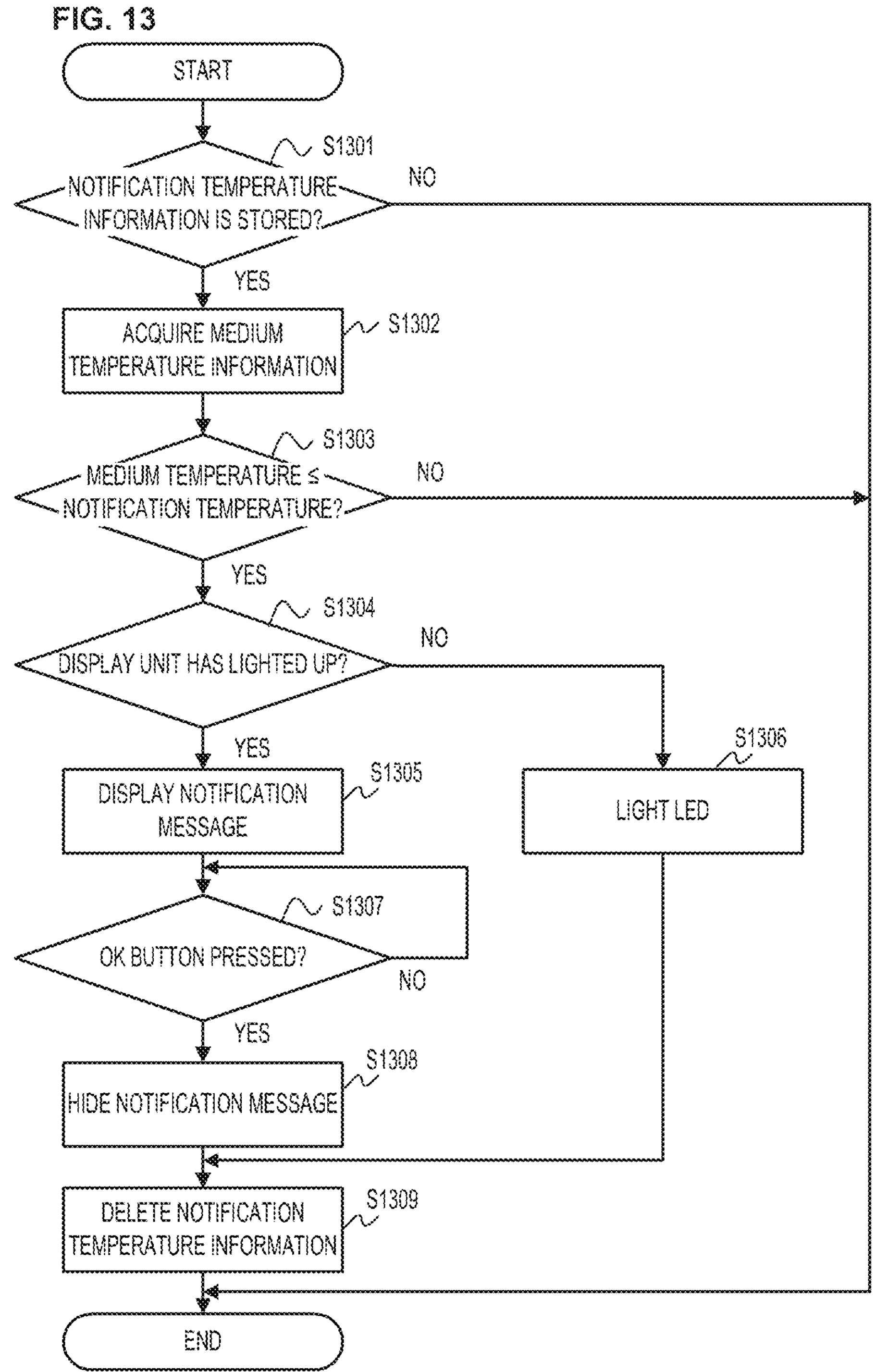
FIG. 13 is a flowchart showing user notification processing according to the fourth embodiment.

Below, processing performed by the digital camera 100 to notify that the medium temperature has changed to a temperature less than or equal to the notification temperature will be described with reference to the flowchart shown in FIG. 13. The processing in the flowchart of FIG. 13 is repeatedly executed by the system control unit 50 at regular intervals based on time information received from the system timer 53. The processing in this flowchart is realized by the system control unit 50 loading a program from the nonvolatile memory 56 to the system memory 52 and executing the program.

In step S1301, the system control unit 50 determines whether or not notification temperature information is stored (recorded) in the system memory 52. In the case of determining that notification temperature information is stored in the system memory 52, the processing proceeds to step S1302, and otherwise, the processing of this flowchart ends.

In step S1302, the system control unit 50 acquires medium temperature information.

In step S1303, the system control unit 50 determines whether or not the medium temperature is less than or equal to the notification temperature (i.e., whether or not the medium temperature has changed to a temperature less than or equal to the notification temperature). In the case of determining that the medium temperature is less than or equal to the notification temperature, the processing proceeds to step S1304, and otherwise, the processing of this flowchart ends.

In step S1304, the system control unit 50 determines whether or not the display unit 28 is operating. Examples of cases where the display unit 28 is not operating include that case where the power of the digital camera 100 is off, the cases where the display unit 28 has been turned off due to a menu setting value, and the case where the display unit 28 is closed and the screen cannot be seen by the user. In the case of determining that the display unit 28 is operating, the processing proceeds to step S1305, and otherwise, the processing proceeds to step S1306.

In step S1305, the system control unit 50 displays the notification message 1202 on the display unit 28.

In step S1306, the system control unit 50 turns on the LED 47 for a predetermined period. The system control unit 50 may cause the LED 47 to blink (may repeatedly turn on and off the LED 47). Note that instead of using the LED 47, the digital camera 100 may emit a specific sound to notify the user that the medium temperature has changed to a temperature less than or equal to the notification temperature.

In step S1307, the system control unit 50 determines whether or not the OK button 1203 has been selected by the user. In the case of determining that the OK button 1203 has been selected, the processing proceeds to step S1308, and otherwise, the processing of step S1307 is repeated (the notification message 1202 continues to be displayed).

In step S1308, the system control unit 50 hides the notification message 1202.

In step S1309, the system control unit 50 deletes the notification temperature information stored (recorded) in the system memory 52.

According to the fourth embodiment, the user can become aware that the medium temperature has changed to a temperature less than or equal to the notification temperature without continuously monitoring the temperature graph. Also, the digital camera 100 uses the LED 47 to notify the user of the same when the display unit 28 is not operating. This allows the user to both lower the medium temperature by not operating the display unit 28 and to become aware that the medium temperature has changed to a temperature less than or equal to the notification temperature. In other words, it is possible to promote a decrease in the medium temperature by not operating the display unit 28.

Fifth Embodiment

In a fifth embodiment, a device 1403 that displays a solid line 603 indicating the recording stop temperature, change (time-series change) in the medium temperature, and change (time-series change) in another temperature will be described.

Figures 14A, 14B:
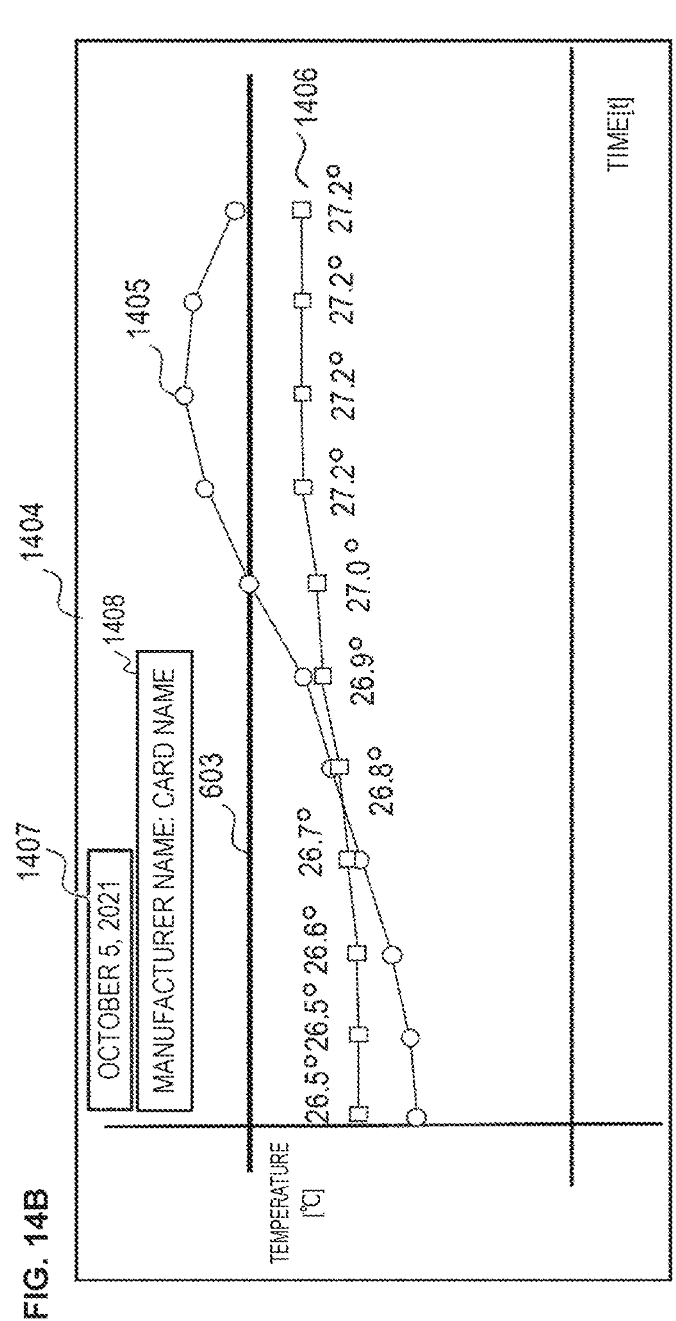
FIGS. 14A and 14B are diagrams illustrating cooperation between a digital camera and a device, according to a fifth embodiment.

FIG. 14A is a diagram illustrating how the digital camera 100 of any of the first to fourth embodiments and the device 1403 are linked (put into communication with each other). The device 1403 is a device that can be linked with the digital camera 100 (e.g., a display control device, a control device, or an information processing device). Examples of the device 1403 include a smartphone and a PC. The configuration of the device 1403 may be similar to part of the configuration of the digital camera 100.

A network 1402 is a network used to link the digital camera 100 and the device 1403. The network 1402 may be a wireless network compliant with a wireless communication standard such as Bluetooth, Wi-Fi (registered trademark), 4G, or 5G. The network 1402 may be a network that enables wired connection (wired communication) using a USB (Universal Serial Bus) cable.

A temperature graph 1404 is a temperature graph that can be displayed on the device 1403. The device 1403 can receive various types of information (e.g., medium temperature information, recording stop temperature information, and the manufacturer name and the individual identification information of the recording medium 200) from the digital camera 100 via the network 1402. In the temperature graph 1404, the vertical axis indicates the temperature, and the horizontal axis indicates time. Note that the temperature graph 1404 displayed on the device 1403 may also be displayed on the display unit 28 of the digital camera 100.

A polygonal line 1405 indicates change in the medium temperature (the temperature of the recording medium 200 mounted to the digital camera 100). A polygonal line 1406 indicates change in the outside temperature, which is based on outside temperature information acquired by the device 1403. The time positions plotted on the polygonal line 1406 may be the same time as the time positions plotted on the polygonal line 1405, or may be positions at different times. A tag 1407 indicates the date and time when the temperatures indicated by the polygonal line 1405 and the polygonal line 1406 were measured. A tag 1408 indicates the manufacturer name and the individual identification information of the recording medium 200, which are based on information received from the digital camera 100. The temperature graph 1404 may be generated for each date, time zone (hour), manufacturer name of the recording medium 200, and individual identification information.

According to the fifth embodiment, change in the outside temperature is displayed together with change in the medium temperature, thus allowing the user to understand the influence of the outside temperature on change in the medium temperature. For example, by referring to the temperature graph, the user can determine that when the outside temperature was less than or equal to a predetermined temperature, the medium temperature did not reach the recording stop temperature in the past, and that there is little need to worry that moving image recording will stop due to a rise in the temperature rise of the recording medium 200.

Sixth Embodiment

In the description of a sixth embodiment, which is given with reference to the flowchart shown in FIG. 15, when "display temperature status" (a setting for displaying a temperature graph) is enabled, the digital camera 100 displays a temperature graph during a period corresponding to a specific device state. In this case, the digital camera 100 does not display a temperature graph during a period not corresponding to the specific device state.

Figure 16:
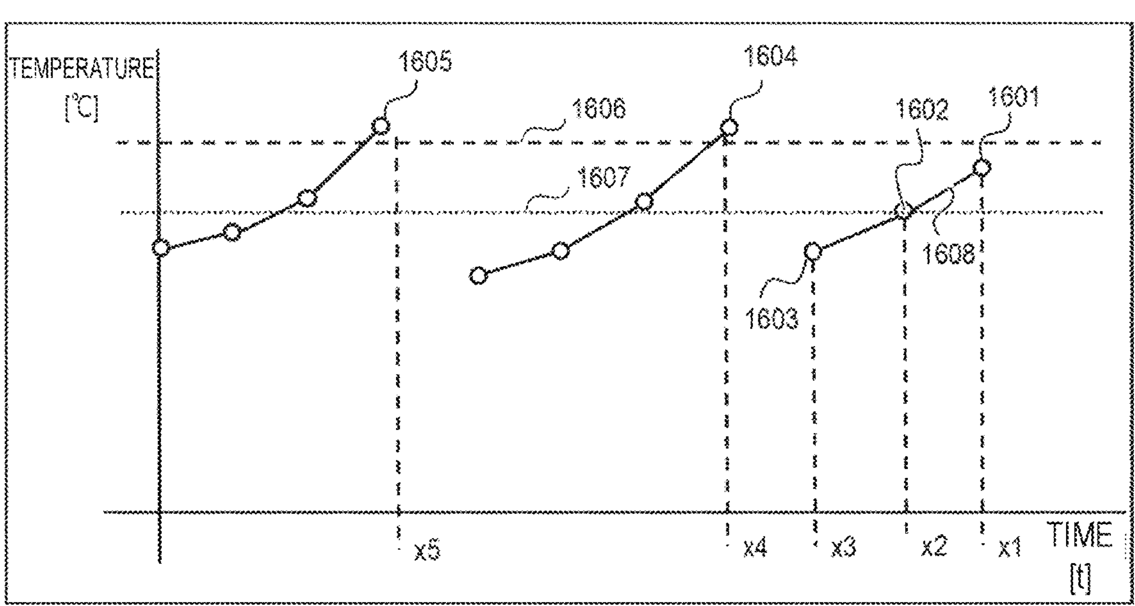
FIG. 16 is a diagram illustrating a temperature graph according to the sixth embodiment.

FIG. 16 shows a temperature graph displayed in the sixth embodiment. This temperature graph is a graph in which medium temperatures at corresponding times are plotted on the graph. The horizontal axis indicates time, and the vertical axis indicates the temperature. The polygonal line indicates change (time-series change) in the medium temperature.

For example, points 1601 to 1605 indicate the medium temperature measured at times x1, x2, x3, x4, and x5, respectively. A line 1608 is a line connecting the plotted points indicating medium temperatures.

A dashed line 1606 indicating an operation restriction temperature is a scale line indicating the medium temperature at which operation is restricted (operation is restricted to ensure user safety or prevent failure of the digital camera 100 when the medium temperature becomes high). Note that although operation restriction is assumed below to be a process for stopping the recording operation, it may also be a process for stopping the flash function, restricting usage of high-quality capturing mode, or the like.

A dotted line 1607 indicating a warning temperature indicates a temperature that is lower than the operation restriction temperature and has a predetermined temperature difference from the operation restriction temperature. If the current medium temperature exceeds the warning temperature, the digital camera 100 may notify the user that the medium temperature is approaching the operation restriction temperature (the difference between the operation restriction temperature and the medium temperature is less than a predetermined temperature difference). For example, the digital camera 100 may display an icon (item) on the display unit 28 that notifies the user that the medium temperature is approaching the operation restriction temperature. Also, the warning temperature may be displayed as a wide line having a predetermined temperature range instead of a line indicating only a certain temperature.

Based on the rate of increase in the medium temperature during moving image recording, the digital camera 100 may set the warning temperature to a temperature that allows continuous image capturing to be performed for longer than the moving image recording time that the user envisions even after the medium temperature reaches the warning temperature.

FIG. 17 shows an example of a portion of temperature record information indicating the correspondence between records of medium temperature, device status, and time. The temperature record information is regularly updated by the system control unit 50 and stored in the memory 32. The device state in the temperature record information indicates a recording standby state (a state of being prepared for recording a moving image) or a moving image recording state (a state in which a moving image is being recorded).

The user starts execution of moving image recording by operating the operation unit 70. When moving image recording starts, the device state of the digital camera 100 changes to the moving image recording state. In the moving image recording state, images generated by the image processing unit 24 are recorded on the recording medium 200.

Also, the time in the temperature record information indicates the time at which the medium temperature information and the device state information were acquired (medium record measurement time). By recording medium temperature information and moving image recording state information in association with time information, it becomes possible to display the temperature graph shown in FIG. 16.

In the present embodiment, it is assumed that the number of correspondence records (combinations of medium temperature, moving image recording state, and time) that can be stored in the temperature record information is 100, and that the temperature record information is updated every minute. However, the number of correspondence records that can be stored in the temperature record information is not limited to this, and may be any number. Furthermore, although the update interval of the temperature record information was set to 1 minute, it may be set in units of seconds or hours, and the update interval may be set by the user.

Note that the temperature record information is loaded to the memory 32 by the system control unit 50. However, by storing the temperature record information in the nonvolatile memory 56, the digital camera 100 may retain the temperature record information even when it is started up next time.

The flowchart shown in FIG. 15 starts from a state in which power is supplied from the power supply unit 30 and the system control unit 50 is activated. The processing in this flowchart is realized by the system control unit 50 loading a program from the nonvolatile memory 56 to the system memory 52 and executing the program.

In step S1501, the system control unit 50 records information on the medium temperature of the digital camera 100 at the current time and information on the current time. Specifically, the system control unit 50 stores the acquired medium temperature information and the current time information in association with each other in the temperature record information.

In step S1502, the system control unit 50 determines whether or not the medium temperature at the current time is lower than the operation restriction temperature. In the case of determining that the medium temperature is lower than the operation restriction temperature, the processing proceeds to step S1503, and otherwise (in the case of determining that the medium temperature is higher than or equal to the operation restriction temperature), the processing proceeds to step S1504.

In step S1503, if operation of the digital camera 100 has been restricted (moving image recording is stopped), the system control unit 50 cancels the operation restriction.

In step S1504, if operation of the digital camera 100 is not being restricted, the system control unit 50 executes the operation restriction. When operation restriction is executed, moving image recording stops.

In step S1505, the system control unit 50 stores information on the device state (the moving image recording state or the recording standby state) of the digital camera 100 at the current time in the temperature record information.

In step S1506, the system control unit 50 determines whether or not "display temperature status" is enabled. In the case of determining that "display temperature status" is enabled, the processing proceeds to step S1508, and otherwise, the processing proceeds to step S1507.

Note that instead of determining whether or not "display temperature status" is enabled, the system control unit 50 may determine whether or not the medium temperature has reached the operation restriction temperature. Alternatively, it may be determined whether or not the medium temperature has reached a predetermined temperature, or whether or not a cooling mode for prioritizing cooling of the digital camera 100 has been set. In other words, the processing may proceed to step S1508 if the current medium temperature reached a predetermined temperature or if the cooling mode has been set.

In step S1507, the system control unit 50 waits for a predetermined time (temperature record information update cycle). The predetermined time is 1 minute in the present embodiment, but may be any time such as 1 second or 1 hour. Until the predetermined time elapses from the time obtained from the system timer 53, the system control unit 50 waits without proceeding to step S1501. Note that the predetermined time may be a time interval that differs according to the type of the digital camera 100, depending on the driving frequency of the temperature measurer 93, the operating frequency of the system control unit 50, or the like.

In step S1508, the system control unit 50 reads information on the medium temperature at the current time and information on the device state from the temperature record information.

In step S1509, the system control unit 50 determines whether or not the device state information most recently read from the temperature record information indicates the moving image recording state. In the case of determining that the device state information indicates the moving image recording state, the processing proceeds to step S1510, and otherwise, the processing proceeds to step S1514.

In step S1510, the system control unit 50 displays information on the medium temperature most recently read out from the temperature record information (hereinafter referred to as the "readout temperature") on the display unit 28. In the example of the temperature graph in FIG. 16, the system control unit 50 can plot points indicating the medium temperature at 11 time positions from a time x1 position to the graph origin time position. These 11 positions are arranged at equal intervals in the horizontal axis direction. Note that if points are already plotted at 11 positions on the temperature graph at the start of step S1510 processing, the system control unit 50 erases the point corresponding to the oldest measurement time, and displays 10 points. The system control unit 50 then proceeds the positions of the 10 points in the horizontal axis direction by one interval (the distance between the points in the horizontal axis direction) closer to the origin. The system control unit 50 then plots the point indicating the readout temperature at the position farther from the origin than the 10 points so that the positions of the 11 points are arranged at equal intervals in the horizontal axis direction.

Here, in the example shown in FIG. 17, since the device state is in the recording standby state (S1509: NO) during the period between the time 1704 and the time 1705, points indicating the medium temperatures that correspond to those times are not displayed in the temperature graph.

In step S1511, the system control unit 50 determines whether or not the difference (interval) between the measurement time of the readout temperature and the measurement time of the medium temperature displayed one position before the readout temperature in the temperature graph (hereinafter referred to as the "previously displayed temperature") is the same as the predetermined time in step S1507. In the case of determining that the difference between these two measurement times is the same as the predetermined time, the processing proceeds to step S1512, and otherwise, the processing proceeds to step S1513. Note that the previously displayed temperature is also the medium temperature that was measured at the time closest to the measurement time of the readout temperature among the medium temperatures measured in the moving image recording state at a time later than the readout temperature.

For example, in the example shown in FIG. 17, in the case where the measurement time of the readout temperature is the time 1703, it is determined that the difference between the time 1703, which is the measurement time of the previously displayed temperature, and the time 1702 is the same as the predetermined time (=1 minute). In the case where the measurement time of the readout temperature is time 1705, it is determined that the difference between the time 1704, which is the measurement time of the previously displayed temperature, and the time 1705 is not the same as the predetermined time.

In step S1512, the system control unit 50 connects the point indicating the readout temperature and the point indicating the previously displayed temperature with a line. For example, in the case where the point indicating the readout temperature is a point 1602, a point 1601 indicating the previously displayed temperature and the point 1602 are connected with a line 1608.

In step S1513, the system control unit 50 determines whether or not the medium temperature is displayed in the entire displayable range (at all display positions, which are the 11 positions in the example shown in FIG. 16) in the temperature graph. In the case of determining that the medium temperature is displayed at all display positions, the processing proceeds to step S1507, and otherwise, the processing proceeds to step S1514.

In step S1514, the system control unit 50 determines whether or not medium temperature information measured (acquired) before the readout temperature (hereinafter referred to as "past medium temperatures") is stored in the temperature record information. In the case of determining that past medium temperature information is stored in the temperature record information, the processing proceeds to step S1515, and otherwise, the processing proceeds to step S1507.

In step S1515, the system control unit 50 reads, from the temperature record information, the medium temperature information and the device state information that correspond to the measurement time closest to the measurement time of the readout temperature among the past medium temperatures stored in the temperature record information.

According to the present embodiment, it is possible to record the medium temperature and the device state at corresponding times and display only the medium temperatures in a specific device state (moving image recording state). Thereby, it is possible to notify the user of change in the medium temperature in a device state that is likely to cause change in the medium temperature, such as the moving image recording state. Furthermore, if the user has set a specific device state multiple times, the user can estimate future change in the medium temperature in the specific state by comparing change in the medium temperature between different times.

Note that in the sixth embodiment, an example is shown in which the operation restriction temperature matches the medium temperature at which operation is actually restricted. However, the operation restriction temperature may be a temperature within a predetermined temperature difference from the medium temperature at which operation is actually restricted. By using a scale line to display a relatively lower temperature with a difference (margin) from the actual operation restriction temperature, it is possible to favorably prompt the user to prevent the medium temperature from reaching the temperature at which operation is actually restricted. In this way, a configuration is possible in which, even when the medium temperature reaches the scale line, operation restriction is not performed immediately, thus preventing impairment to usability.

Also, there are cases where the interval of time between measurement of the medium temperature in the moving image recording state (S1511) is not the same as the predetermined time, which is the standby time (S1507), such as the case where the device state is the recording standby state for a long time or the case where the digital camera 100 is turned off. The intervals between the points plotted on the temperature graph may be equal intervals as described above, or may be intervals corresponding to the actual elapsed time. Also, in the temperature graph, the intervals between points not connected by lines may be a constant interval different from the intervals between points connected by lines.

Also, in the temperature graph shown in FIG. 16, points indicating medium temperature are displayed at 11 display positions, but in for all past medium temperatures corresponding to the moving image recording state to be displayed, the number of display positions may be increased or decreased, or the scale of the polygonal line (line graph) may be changed. Also, it is possible to display only points indicating the medium temperature at times from the most recent time when the device state is the moving image recording state to a certain period of time in the past in the temperature record information. Also, it is possible to display only points indicating the medium temperature during a period of a specific number of moving image recording states may be displayed, with the period from the start of a moving image recording state to the end of that moving image recording state being one time.

Seventh Embodiment

In the description of a seventh embodiment, the digital camera 100 records past "temperature record information" that includes the medium temperature information, the device state information, and the medium temperature measurement time information according to the sixth embodiment, and displays past change in the medium temperature based on the past temperature record information. Also, the digital camera 100 displays past change (time-series change) in the medium temperature and current change (time-series change) in the medium temperature in an overlapping manner. The current change in the medium temperature is change in the medium temperature that at least indicates the medium temperature within a predetermined time (e.g., within 30 minutes) since measurement. The past change in the medium temperature is change in the medium temperature measured at a time before the time when the medium temperature indicated by the current change in the medium temperature was measured.

Figure 18:
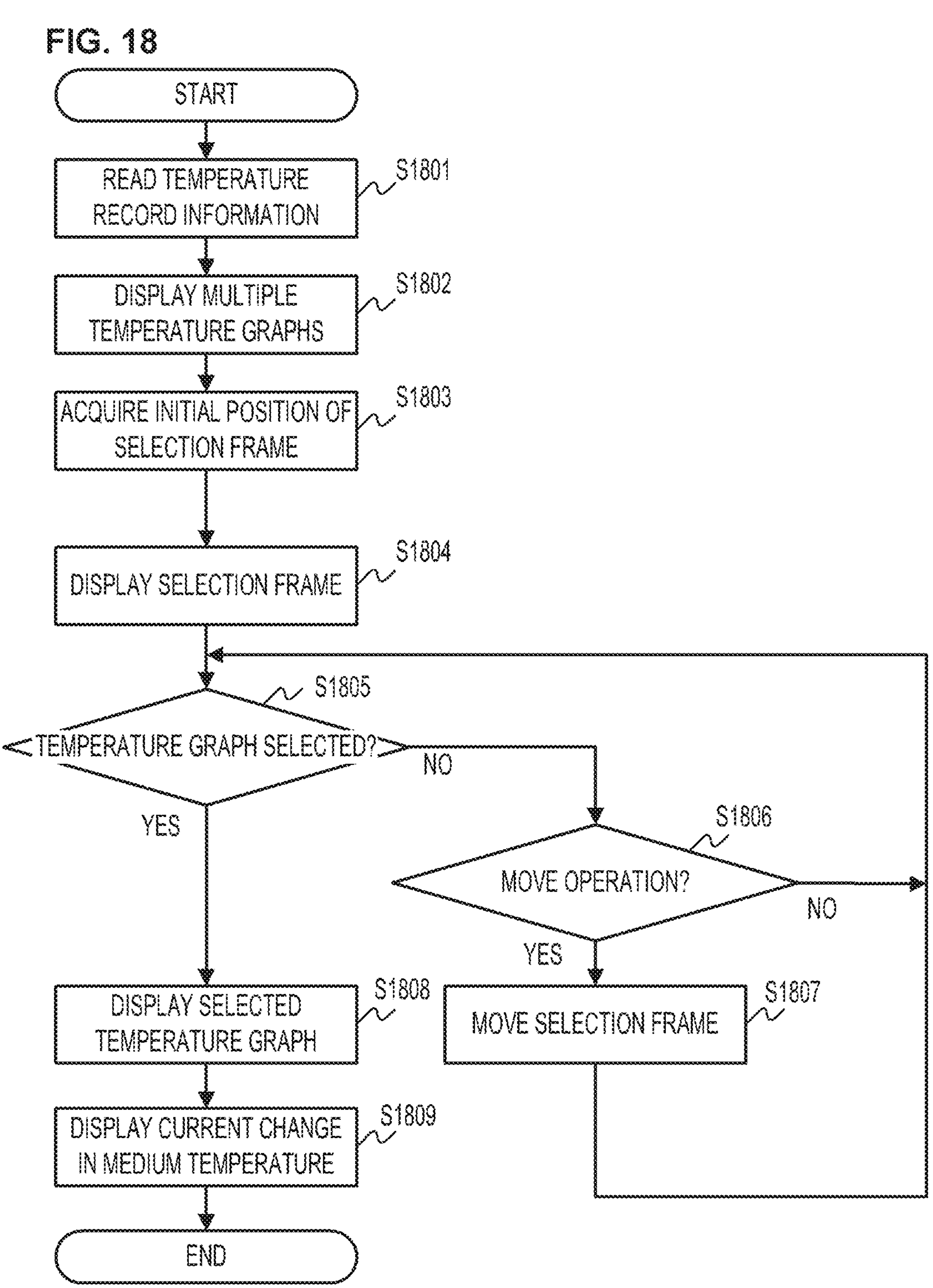
FIG. 18 is a flowchart showing processing of a digital camera according to a seventh embodiment.

FIG. 18 is a flowchart illustrating processing for displaying past change in the medium temperature based on temperature record information in an overlapped manner on current change in the medium temperature based on a user operation. The processing of this flowchart starts when a "temperature graph comparison" item is selected on a menu screen displayed when a menu button, which is one of the operation units 70, is pressed by the user. The processing in this flowchart is realized by the system control unit 50 loading a program from the nonvolatile memory 56 to the system memory 52 and executing the program.

Figure 19:
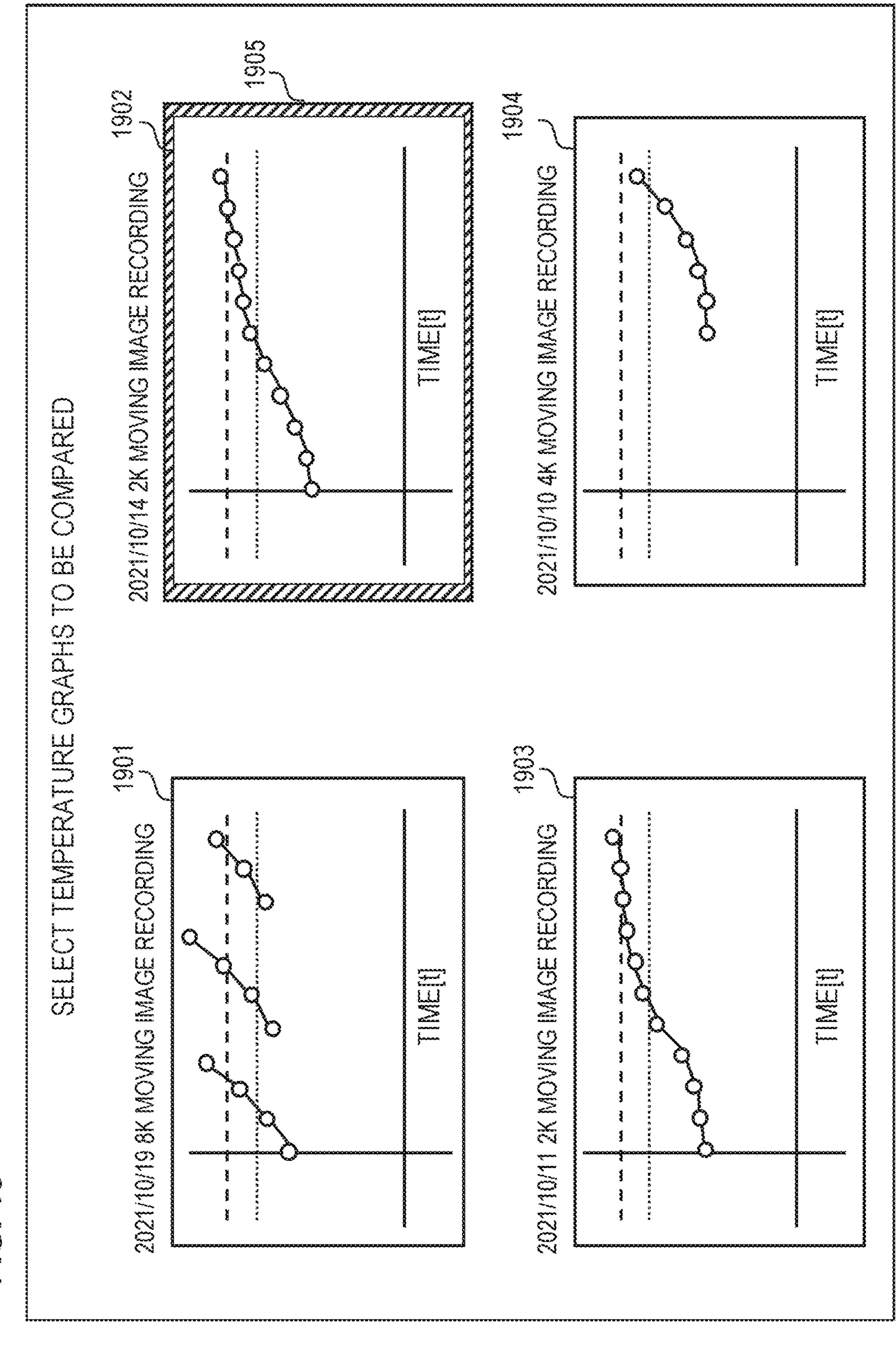
FIG. 19 is a diagram illustrating a graph list screen according to the seventh embodiment.

FIG. 19 shows a graph list screen that is displayed when the "temperature graph comparison" item is selected on the menu screen. Temperature graphs 1901 to 1904 each indicate past change in the medium temperature based on past temperature record information. In the seventh embodiment, the digital camera 100 stores temperature record information in the nonvolatile memory 56 in correspondence with the date and recording resolutions (e.g., 2K, 4K, and 8K). The digital camera 100 generates the temperature graphs 1901 to 1904 by reading the temperature record information when displaying the graph list screen. A selection frame 1905 is a frame for selecting one temperature graph. The selection frame 1905 shows any one of the temperature graphs 1901 to 1904. While one of the temperature graphs 1901 to 1904 is indicated by the selection frame 1905, the user can select the temperature graph indicated by the selection frame 1905 by pressing a set button 75.

Figure 20:
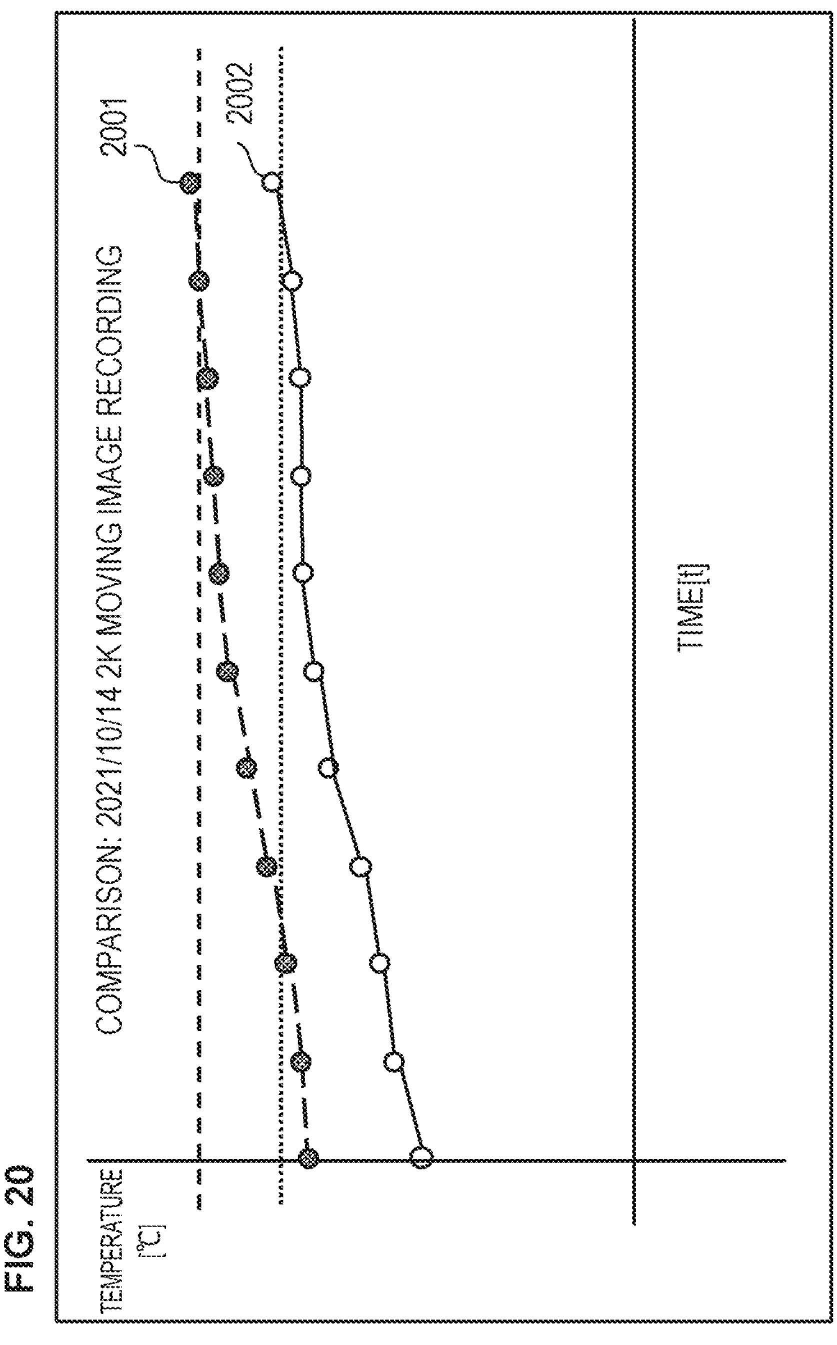
FIG. 20 is a diagram illustrating a temperature graph according to the seventh embodiment.

FIG. 20 shows a temperature graph displayed after the temperature graph indicated by selection frame 1905 is selected by the user. In the temperature graph shown in FIG. 20, a polygonal line 2001 indicates change in the past medium temperature corresponding to the temperature graph selected by the user, and a polygonal line 2002 indicates change in the current medium temperature.

In step S1801, the system control unit 50 reads past temperature record information from the nonvolatile memory 56 for each date and recording resolution.

In step S1802, the system control unit 50 displays a plurality of temperature graphs showing past change in the medium temperature based on the past temperature record information read out in step S1801. In the present embodiment, the system control unit 50 reads four pieces of past temperature record information with the most recent dates from the nonvolatile memory 56, and generates the temperature graphs 1901 to 1904 showing past change in the medium temperature in the moving image recording state. Note that if past temperature record information is not stored in the nonvolatile memory 56, a polygonal line is not displayed on the temperature graph.

Note that in the present embodiment, the system control unit 50 displays four temperature graphs based on the pieces of temperature record information with the most recent dates. However, the present invention is not limited to this, and the number of temperature graphs displayed may be more than four or less than four. Furthermore, a temperature graph based on older temperature record information may be displayed. Moreover, any number of temperature graphs may be displayed based on the temperature record information selected by the user operation.

In step S1803, the system control unit 50 acquires information on the initial position of the selection frame. For example, the system control unit 50 acquires a position indicating a specific temperature graph (the temperature graph 1901 in the example shown in FIG. 19) as the initial position of the selection frame, and stores information on the initial position in the memory 32. Note that the initial position may be a position showing any temperature graph, or may be a position not showing any temperature graph.

In step S1804, the system control unit 50 displays the selection frame at the initial position. As a result, the graph list screen shown in FIG. 19 is displayed on the display unit 28. In the example shown in FIG. 19, the system control unit 50 displays the selection frame 1905 over the temperature graph displayed in step S1802 on the display unit 28.

In step S1805, the system control unit 50 determines whether or not one temperature graph was selected from among the temperature graphs displayed on the display unit 28 by the user pressing the set button 75. In the case of determining that the set button 75 was pressed by the user, the processing proceeds to step S1808, and otherwise, the processing proceeds to step S1806.

In step S1806, the system control unit 50 determines whether or not the user has performed an operation to move the selection frame. In the case of determining that a selection frame movement operation was performed, the processing proceeds to step S1807, and otherwise, the processing returns to step S1805.

In step S1807, the system control unit 50 moves the position of the selection frame in accordance with the movement operation. In the example shown in FIG. 19, the system control unit 50 moves the selection frame 1905 to a position indicating one of the temperature graphs 1901 to 1904 in accordance with the movement operation.

In step S1808, the system control unit 50 displays the temperature graph that was selected in step S1805. In the examples of FIGS. 19 and 20, the system control unit 50 displays, for example, the temperature graph 1902 selected in step S1805 from among the temperature graphs 1901 to 1904. As a result, as shown in FIG. 20, a polygonal line 2001 indicating past change in the medium temperature is displayed.

In step S1809, the system control unit 50 displays the current change in the medium temperature. In the example shown in FIG. 20, the system control unit 50 displays a polygonal line 2002 indicating the current change in the medium temperature in the moving image recording state, in an overlapped manner with the polygonal line 2001.

According to the present embodiment, it is possible to display and compare the past change in the medium temperature selected by the user and the current change in the medium temperature. This allows the user to estimate future change in the medium temperature by referring to past change in the medium temperature.

In the present embodiment, one past change in the medium temperature and the current medium temperature change are displayed for comparison, but the present invention is not limited to this, and a plurality of past changes in the medium temperature may be displayed (selected).

Also, in the present embodiment, temperature record information is recorded for each date and recording resolution, but temperature record information may be recorded for each date, or temperature record information may be recorded for each recording resolution.

Furthermore, in the present embodiment, the digital camera 100 displays the polygonal line 2001 indicating past change in the medium temperature and the polygonal line 2002 indicating current medium temperature change in an overlapping manner. However, the present invention is not limited to this, and the digital camera 100 may display the polygonal line 2001 and the polygonal line 2002 side by side vertically or horizontally. Furthermore, a configuration is possible in which the polygonal lines can be moved up, down, left, and right in accordance with user operations to facilitate comparison. Furthermore, the user may be able to adjust the range of time displayed on the temperature graph in the past temperature record information.

In the above-described embodiments, the device state is the recording standby state or the moving image recording state, but the device state is not limited to this, and may be any other device state that influences the medium temperature or operation restriction. For example, the device state may be the inserted/removed state of a recording medium that can be inserted into the recording medium 200. Furthermore, the device state may be the inserted/removed state for each piece of recording medium identification information, such as manufacturer information, or the inserted/removed state for each recording medium type, such as CFexpress card or SD card. Moreover, the device state may be a pre/post setting initialization state read from the non-volatile memory 56 (state before setting initialization, or state after setting initialization), or a pre/post firmware version information change state. The device state may be a moving image recording setting state, such as a setting regarding the recording format (recording format such as file format or codec), the recording resolution, the frame rate, or the like.

The device state may be an operating state of a display unit, including the display unit 28 or the non-viewfinder display unit 43, or a lighting brightness state indicating the brightness of the display unit when the display unit is operating. The device state may be the communication status of an external input/output terminal included in the interface 18. The device state may be the attachment state of an external member such as a lens (e.g., the lens unit 150), a tripod, various terminals, a handle, a strobe, a light, a rig, a mudguard, a filter, or a housing.

The device state may be a state indicating a power saving mode with different power consumption, or a state indicating a high performance mode in which power consumption is higher than usual to improve performance. The device state may be a state indicating a cooling mode in which, rather than normal operation, operation is performed such that priority is given to cooling the medium temperature. The device state may be a state indicating a sensor drive mode in which the update cycle or the pixel signal readout method of a sensor such as the imaging unit 22 is different from normal. The device state may be a power state of a battery included in the power supply unit 30, an AC power supply, a USB power supply unit, or the like. The device state may be a state of the weather and temperature at the current location acquired by external communication by the communication unit 54 or the temperature measurer 93, or a state of the surrounding environment that can be estimated from the weather and temperature. The device state may be the state of a device setting (the aperture value of the lens unit 150, the shutter speed of the shutter 101, the sensitivity of the imaging unit 22, the value of the exposure value Ev obtained from an imaging result), or a state of the surrounding environment that can be estimated from the device setting.

Furthermore, the embodiments described above can be combined in any way as long as no contradiction arises. For example, in a temperature graph may display, a scale line indicating the warning temperature, a scale line indicating the recording stop temperature, and a scale line indicating the operation restriction temperature may be displayed together with the time-series change in the current medium temperature and the past time-series change in the medium temperature.

According to the present invention, a user can easily determine the extent of a temperature-related risk in an electronic device.

Note that the various types of control described above as being performed by the system control unit 50 may be performed by a single piece of hardware, or overall device control may be performed by multiple pieces of hardware (e.g., multiple processors or circuits) sharing the processing.

Also, although the present invention has been described in detail based on preferred embodiments, the present invention is not limited to these specific embodiments, and the present invention also encompasses various modes that do not depart from the gist of the present invention. Furthermore, the embodiments described above are merely possible embodiments of the present invention, and it is also possible to combine the embodiments as appropriate.

Furthermore, in the above-described embodiments, examples are described in which the present invention is applied to a digital camera, but the present invention is not limited to this, and the present invention is applicable to any electronic device in which the temperature of the recording medium can be detected, and whose operation is restricted in accordance with the temperature. Specifically, the present invention is applicable to personal computers, PDAs, mobile phone terminals, portable image viewers, printer devices with displays, digital photo frames, music players, game machines, electronic book readers, and the like.

Furthermore, the present invention is applicable not only to an image capturing device itself, but also to a control device (display control device) that communicates with the image capturing device (including a network camera) via wired or wireless communication and remotely controls the image capturing device. Examples of devices that can remotely control an image capturing device include devices such as smartphones, tablet PCs, and desktop PCs. The image capturing device can be controlled remotely by the control device notifying the image capturing device of commands to perform various types of operations and configure setting values, based on operations performed on the control device and processing performed on the control device. Furthermore, a live view image captured by the image capturing device may be received via wired or wireless communication and displayed by the control device.

The various controls described above may or may not be performed by a single hardware (e.g., a processor or circuit). A plurality of hardware (e.g., a plurality of processors, a plurality of circuits, or a combination of one or more processors and one or more circuits) may share the processing to control the entire device.

The above processors are processors in the broadest sense and include both general purpose and specialized processors. The general-purpose processors include, for example, CPU (Central Processing Unit), MPU (Micro Processing Unit), and DSP (Digital Signal Processor). The specialized processors include, for example, GPU (Graphics Processing Unit), ASIC (Application Specific Integrated Circuit), PLD (Programmable Logic Device), etc. The programmable logic devices are, for example, FPGA (Field Programmable Gate Array), CPLD (Complex Programmable Logic Device), etc.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the above-described embodiments, and various changes and modifications can be made without departing from the spirit and scope of the present invention. Therefore, the following claims are appended to set forth the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display control device comprising:
a processor; and
a memory storing a program which, when executed by the processor, causes the display control device to
perform a temperature acquiring process to acquire information on a medium temperature, the medium temperature being a temperature of a first recording medium mounted to an electronic device,
perform a determining process to determine whether or not the electronic device supports the first recording medium; and
perform a control process to perform control to display, on a display, an item and time-series change in the medium temperature, the item indicating a first temperature at which a specific operation of the electronic device is possibly restricted in a case where the medium temperature reaches the first temperature, or indicating a second temperature based on the first temperature and lower than the first temperature, and not to display, on the display, the item in a case where it has determined that the electronic device does not support the first recording medium.

2. The display control device according to claim 1, wherein in the temperature acquiring process, the information on the medium temperature measured by the first recording medium is acquired.

3. The display control device according to claim 1, wherein the first temperature is a temperature at which the specific operation of the electronic device is restricted in a case where the medium temperature reaches the first temperature.

4. The display control device according to claim 1 wherein
in a case where information on a third temperature is recorded in advance in a storage, the first temperature is the third temperature, and
the third temperature is the medium temperature at a time when the specific operation of the electronic device was restricted in the past due to a rise in the medium temperature.

5. The display control device according to claim 4, wherein in a case where the information on the third temperature is not recorded in advance in the storage, the first temperature is a temperature of a second recording medium at a time when the specific operation has been restricted due to a rise in the temperature of the second recording medium, a manufacturer of the second recording medium being identical to a manufacturer of the first recording medium.

6. The display control device according to claim 4, wherein in a case where the specific operation has been restricted due to a buffer overflow, and furthermore a recording medium temperature is higher than a predetermined threshold value at a time when the specific operation is restricted, in the control process, it is determined that the specific operation of the electronic device has been restricted due to a rise in the recording medium temperature.

7. The display control device according to claim 4, wherein in a case where the specific operation has been restricted due to a buffer overflow, a recording medium temperature is less than or equal to a predetermined threshold value at a time when the specific operation has been restricted, and furthermore a recording medium writing speed immediately before restriction of the specific operation is slower than a recording medium writing speed at a start of the specific operation, in the control process, it is determined that the specific operation of the electronic device has been restricted due to a rise in the recording medium temperature.

8. The display control device according to claim 1, wherein in a case where the specific operation of the electronic device is restricted due to a rise in the medium temperature, in the control process, the display is controlled to display the item indicating the first temperature that is the medium temperature at a time when the specific operation has been restricted.

9. The display control device according to claim 1, wherein in the control process,
the display is controlled to display the time-series change in the medium temperature in a period in which the electronic device is in a specific device state, and
the display is controlled to not display the time-series change in the medium temperature in a period in which the electronic device is not in the specific device state.

10. The display control device according to claim 1, wherein
an acquiring process is performed to acquire information on a fourth temperature set by a user; and
a notifying process is performed to, in a case where the medium temperature has changed to a temperature less than or equal to the fourth temperature, notify the user that the medium temperature has changed to a temperature less than or equal to the fourth temperature.

11. The display control device according to claim 10, wherein
in a case where the display is lighted up, in the notifying process, the user is notified that the medium temperature has changed to a temperature less than or equal to the fourth temperature by displaying a predetermined character string on the display, and in a case where the display is not lighted up, in the notifying process, the user is notified that the medium temperature has changed to a temperature less than or equal to the fourth temperature by lighting or blinking a predetermined light emitting device.

12. The display control device according to claim 1, wherein in the control process, the display is controlled to display the item at a predetermined position regardless of a value indicated by the first temperature or the second temperature.

13. The display control device according to claim 1, wherein in the control process, the display is controlled to display past time-series change in the medium temperature and current time-series change in the medium temperature.

14. The display control device according to claim 1, wherein in the control process, a user is notified in a case where the medium temperature exceeds the second temperature.

15. The display control device according to claim 1, wherein in the control process, the display is controlled to display time-series change in an outside temperature, together with the time-series change in the medium temperature.

16. The display control device according to claim 1, wherein the first recording medium is a first type of recording medium or a second type of recording medium, and in the control process, a display mode of the item in a case where the first recording medium is the first type of recording medium, and a display mode of the item in a case where the first recording medium is the second type of recording medium are different.

17. A display control method comprising:

acquiring information on a medium temperature, the medium temperature being a temperature of a first recording medium mounted to an electronic device, determining whether or not the electronic device supports the first recording medium; and performing control to display, on a display, an item and time-series change in the medium temperature, the item indicating a first temperature at which a specific operation of the electronic device is possibly restricted in a case where the medium temperature reaches the first temperature, or indicating a second temperature based on the first temperature and lower than the first temperature, and not to display, on the display, the item in a case where it has determined that the electronic device does not support the first recording medium.

18. A non-transitory computer readable medium that stores a program, wherein the program causes a computer to execute a display control method comprising:

acquiring information on a medium temperature, the medium temperature being a temperature of a first recording medium mounted to an electronic device, determining whether or not the electronic device supports the first recording medium; and performing control to display, on a display, an item and time-series change in the medium temperature, the item indicating a first temperature at which a specific operation of the electronic device is possibly restricted in a case where the medium temperature reaches the first temperature, or indicating a second temperature based on the first temperature and lower than the first temperature, and not to display, on the display, the item in a case where it has determined that the electronic device does not support the first recording medium.

* * * * *